United States Patent
Yoda et al.

(10) Patent No.: US 7,821,531 B2
(45) Date of Patent: Oct. 26, 2010

(54) INTERFACE SYSTEM

(75) Inventors: Ikushi Yoda, Ibaraki (JP); Katsuhiko Sakaue, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 1277 days.

(21) Appl. No.: 10/540,127

(22) PCT Filed: Dec. 17, 2003

(86) PCT No.: PCT/JP03/16171

§ 371 (c)(1),
(2), (4) Date: Dec. 14, 2005

(87) PCT Pub. No.: WO2004/055726

PCT Pub. Date: Jul. 1, 2004

(65) Prior Publication Data

US 2006/0168523 A1    Jul. 27, 2006

(30) Foreign Application Priority Data

Dec. 18, 2002  (JP) ............................ 2002-366432
Jun. 11, 2003  (JP) ............................ 2003-166659

(51) Int. Cl.
*H04N 7/18*    (2006.01)

(52) U.S. Cl. ........................ 348/143; 348/144; 348/152; 348/159

(58) Field of Classification Search .......... 348/143–160
See application file for complete search history.

(56) References Cited

U.S. PATENT DOCUMENTS 6,611,206 B2 *  8/2003  Eshelman et al. ........ 340/573.1

(Continued)

FOREIGN PATENT DOCUMENTS

JP    10-031551    2/1998

(Continued)

OTHER PUBLICATIONS

Yasushi Ida, Katsuhiko Sakaue, "3 Jigen no Ugoki Joho o Riyo Shita Fukusu Taishobutsu no Chushutsu to Sono Jitsujikan Ninshiki", The Transactions of the Institute of Electronics, Information and Communication Engineers D-2, vol. J81-D-2, No. 9, pp. 2043 to 2051, Sep. 25, 1998.

(Continued)

*Primary Examiner*—Marsha D Banks Harold
*Assistant Examiner*—Chikaodili E Anyikire
(74) *Attorney, Agent, or Firm*—Oblon, Spivak, McClelland, Maier & Neustadt, L.L.P.

(57) ABSTRACT

To provide an interface apparatus capable of achieving non-contact and unrestricted arm pointing actions of multiple users in an indoor space, and facilitating the recognition of all typical arm pointing actions in standing, sitting, and lying postures and the operation of indoor units in the indoor space by the arm pointing actions. The interface apparatus includes: image processing means for picking up images of the interior of an indoor space 5 with a plurality of stereo cameras 1-1 to 1-n, and producing a distance image based on the picked-up images within the visual field on a camera-by-camera basis and the coordinate system of the indoor space 5; means for extracting the posture and arm pointing of a user 4 from the distance information from the stereo cameras 1-1 to 1-n; and means for determining, when the arm pointing has been identified, whether the arm pointing is an intended signal, from the direction pointed by the arm and the motion of the arm.

14 Claims, 25 Drawing Sheets

U.S. PATENT DOCUMENTS

| | | | |
|---|---|---|---|
| 6,677,969 B1 * | 1/2004 | Hongo | 715/863 |
| 6,788,809 B1 * | 9/2004 | Grzeszczuk et al. | 382/154 |
| 7,036,094 B1 * | 4/2006 | Cohen et al. | 715/863 |

FOREIGN PATENT DOCUMENTS

| | | |
|---|---|---|
| JP | 2000-056916 | 2/2000 |
| JP | 2000-259337 | 9/2000 |
| JP | 2001-216527 | 8/2001 |
| JP | 2002-259989 | 9/2002 |

OTHER PUBLICATIONS

U.S. Appl. No. 10/489,301, filed Mar. 16, 2004, Yoda, et al.

* cited by examiner

30 DEGREE

60 DEGREE    FROM THE UPPERMOST TO THE END OF HEAD PART OF BED

INTERFACE SYSTEM

TECHNICAL FIELD

The present invention relates to an interface apparatus, and more specifically, it relates to a gesture-based interface apparatus in an indoor space, the interface apparatus having the function of identifying an arm pointing action and corresponding thereto.

BACKGROUND ART

There is a system in which a user 84 is located in front of a display 82 having cameras 81-1 and 81-2, shown in FIG. 1, and a mouse and the like is operated by finger-pointing of the user 84, in which the position of the user 84 is determined and the mouse and the like is operated from the images of as few as two or three cameras.

A recognition object region 83 is therefore a specified space in front of the display 82, posing the problem of providing a very small space to allow only one person to use.

Furthermore, also the hand-sign recognition system, as shown in FIG. 2, which is used as an interface apparatus that acquires and recognizes the image of a hand alone of a user 94 in a fixed environment in front of a camera 91, has the same problem. In the drawing, numeral 92 denotes a display and numeral 93 indicates a recognition object region.

[Patent Document 1] Japanese Unexamined Patent Application Publication No. 11-327753, pp. 5-10, FIG. 1

[Patent Document 2] Japanese Unexamined Patent Application Publication No. 2000-216, pp. 4-5, FIG. 1

[Patent Document 3] Japanese Unexamined Patent Application Publication No. 2002-251235, pp. 4-7, FIG. 1

DISCLOSURE OF INVENTION

These conventional types of interface apparatuses have the problem that they are operable only in specific narrow and fixed environments.

The present invention has been made in light of such circumstances, and has as an object the provision of an interface apparatus capable of achieving noncontact and unrestricted arm pointing actions of multiple users in an indoor space, and facilitating the recognition of typical arm pointing actions in standing, sitting, and lying postures and the operation of an indoor device in the indoor space by the arm pointing actions.

To achieve the above object, the present invention is characterized in that:

[1] An interface apparatus includes: image processing means for picking up images of the interior of an indoor space with a plurality of stereo cameras, and producing a distance image based on the picked up images within the visual field and an indoor coordinate system on a camera-by-camera basis; positional-posture and arm-pointing recognition means for extracting the positional posture and arm pointing of a user from the distance information from the stereo cameras; and pointing-action recognition means for determining, when arm pointing by the user has been identified, whether or not the arm pointing is a pointing action, from the pointing direction and the motion of the arm.

[2] The interface apparatus as set forth in [1] further includes an operation-command transmitter-receiver that transmits a command for operating a registered indoor device according to the operation of the pointing-action recognition means and receives the result.

[3] In the interface apparatus as set forth in [1] or [2], the positional-posture and arm-pointing recognition means includes a positional-posture recognition section that performs a posture recognition process for multiple users by extracting the distance data from the collected three-dimensional information along the indoor-space coordinate system by a different-level extracting method and projecting the data onto a two-dimensional plane, and an arm-pointing recognition section that determines the direction of the arm pointing from the obtained two-dimensional projection drawing of the multiple users.

[4] In the interface apparatus as set forth in [1] or [2], the pointing-action recognition means includes an pointing-action recognition section that recognizes the pointing action from time-series data on the obtained arm-pointing direction, an operating-unit database that stores information on the operation object unit that is an object of arm pointing and an operation method for the same, and an operating-unit registration section that stores basic information, position, and an operating method of the operation object unit.

[5] In the interface apparatus as set forth in [1], the positional-posture and arm-pointing recognition means for extracting arm pointing recognizes a pointing action in such a way that: the recognition means divides three-dimensional distance information obtained from the stereo cameras into levels by 20 cm according to the indoor coordinate system by a different-level extracting method; projects a dot sequence in each level onto a two-dimensional plane and then binarizes it into a two-dimensional binary image; labels the images on a level-to-level basis; determines the overall center of gravity of the clusters; stacks the center of gravity determined in each two-dimensional plane in levels on object-to-object basis again to use as a three-dimensional dot sequence; plots the center of gravity of each level along the Z-axis, in which eight levels (the upper half of a body) from the uppermost level (the head) are plotted on the X-Y plane; wherein when there is a large outlier compared to the overall center of gravity, determines that an arm-pointing action has been made; determines the direction of the body by calculating the image moments of the binary images of the eight levels from the uppermost, the image moment being a rectangle equivalent to the binary image, and determining the vertical direction of the long side of a level having an area within a specified range and in which the difference between the long side and the short side of the image moment is the largest of the acquired eight sets of data as the direction of the body; when the arm-pointing action has been recognized, the recognition means determines the direction of the arm pointing in such a way that: it determines the direction of the arm pointing on the X-Y plane by drawing a perpendicular bisector between the overall center of gravity and the center of gravity of the binary image of a level of which the center of gravity is farthest from the overall center of gravity, erasing the binary image in the region corresponding to the body of the person to leave only the image of the arm; calculates the image moment of the binary image of only the arm to determine the long side, the center of gravity, the position of the distal end of the arm, and the overall center of gravity; and determines the Z-direction of the arm pointing from the stature, the height of eyes, and arm-length coefficient.

[6] In the interface apparatus as set forth in [5], the lower limit of determination on arm pointing is set from the head height and the height corresponding to the sitting height, wherein false arm pointing which is sensed lower than the lower limit is determined not to be arm pointing.

[7] In the interface apparatus as set forth in [6], false arm pointing which is sensed lower than the lower limit is the case in which the user stretches out his leg.

[8] In the interface apparatus as set forth in [5], when the ratio of the long side of the image moment to the stature is less than a given value, it is determined not to be arm pointing.

[9] In the interface apparatus as set forth in [5], when r1/r2 is smaller than or equal to a value set from the stature, it is determined not to be arm pointing, where r1 is the distance from an average center of gravity to the distal end of the arm pointing and r2 is the distance from the average center of gravity to the base end of the arm pointing.

[10] In the interface apparatus as set forth in [8] or [9], slight arm pointing comes under.

[11] In the interface apparatus as set forth in [5], the area S of the image moment is determined from the long side L1 and the short side L2, and the upper limit is set for the area S and the lower limit is set for the long side L1, wherein, when the area S or the long side L1 is outside the limit, it is determined not to be arm pointing.

[12] In the interface apparatus as set forth in [5], when the ratio of the distance between the distal end of the arm pointing and an average center of gravity to the distance between the base end of the arm pointing and the average center of gravity is greater than a set value, it is determined not to be arm pointing.

[13] In the interface apparatus as set forth in [11] or [12], when the value is outside the limit, it is determined that both arms are spread out.

[14] In the interface apparatus as set forth in [5], when the average center of gravity of a partner is found within a specified radius around the distal end of the user's arm pointing, it is determined not to be arm pointing.

[15] In the interface apparatus as set forth in [1] or [2], a specified area in the indoor space is registered in advance, wherein when a user is present in the specified area, the arm pointing of the user is identified.

[16] In the interface apparatus as set forth in [15], with the periphery of the head part on a nursing bed being set as the specified area, when a user is present in the specified area, arm pointing for the specified area is identified.

[17] In the interface apparatus as set forth in [16], with the periphery of the head part on a nursing bed being set as the specified area, when no user is present in the specified area, it is determined whether the user is in a standing, sitting, or lying posture and then arm pointing is identified for the respective postures.

According to the invention, the positions of users in a room are specified while the postures of the users in the indoor space are being identified from the distance information from the cameras. A command for operating a registered indoor unit is sent by a pointing action (arm pointing) to point the indoor unit with an arm directly.

Furthermore, the invention provides means for registering indoor unit to be operated by a pointing action (arm pointing) and its operation details, and means for registering a command for the indoor unit.

According to the invention, arm pointing can be sensed accurately, and seeming arm pointing behaviors (false arm pointing) are excluded from arm pointing without fail to allow accurate determination on arm pointing.

BEST MODE FOR CARRYING OUT THE INVENTION

Embodiments of the invention will be specifically described.

Figure 1:
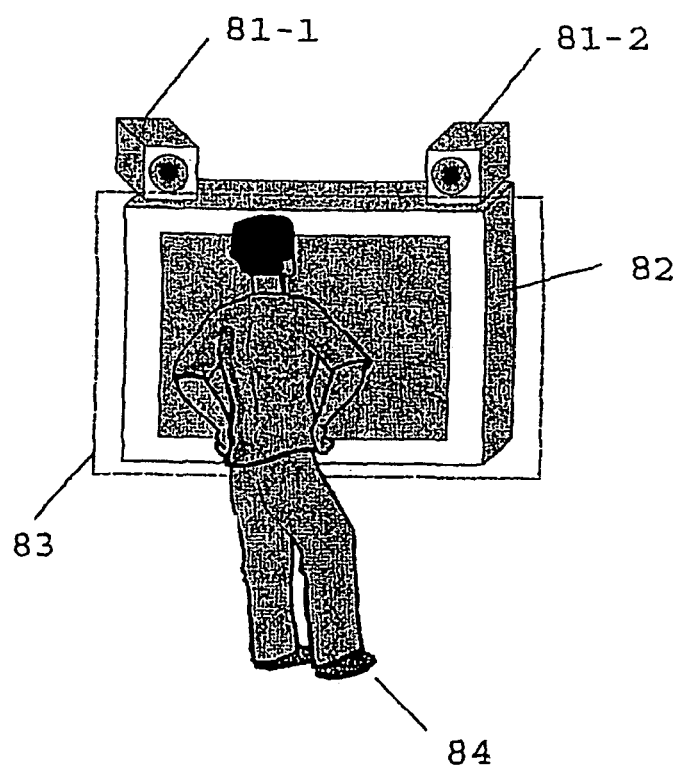
FIG. 1 is a diagram of a related art.
Figure 2:
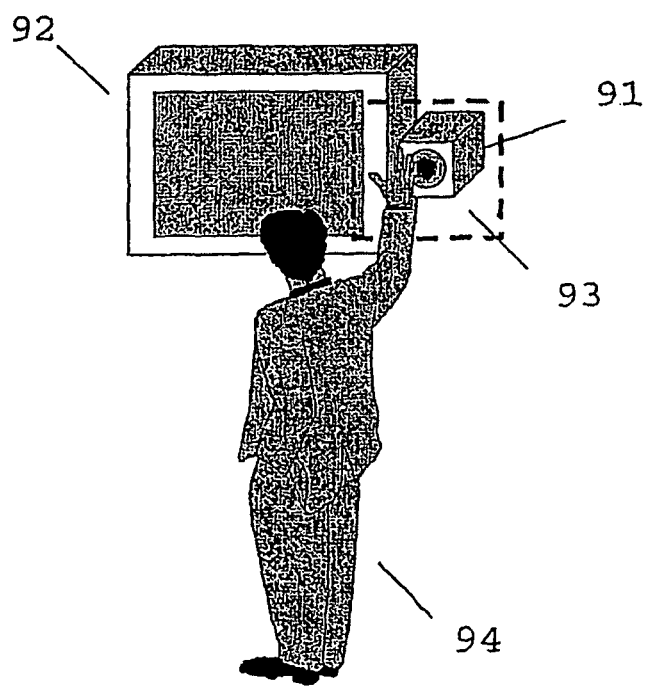
FIG. 2 is a diagram of another related art.
Figure 3:
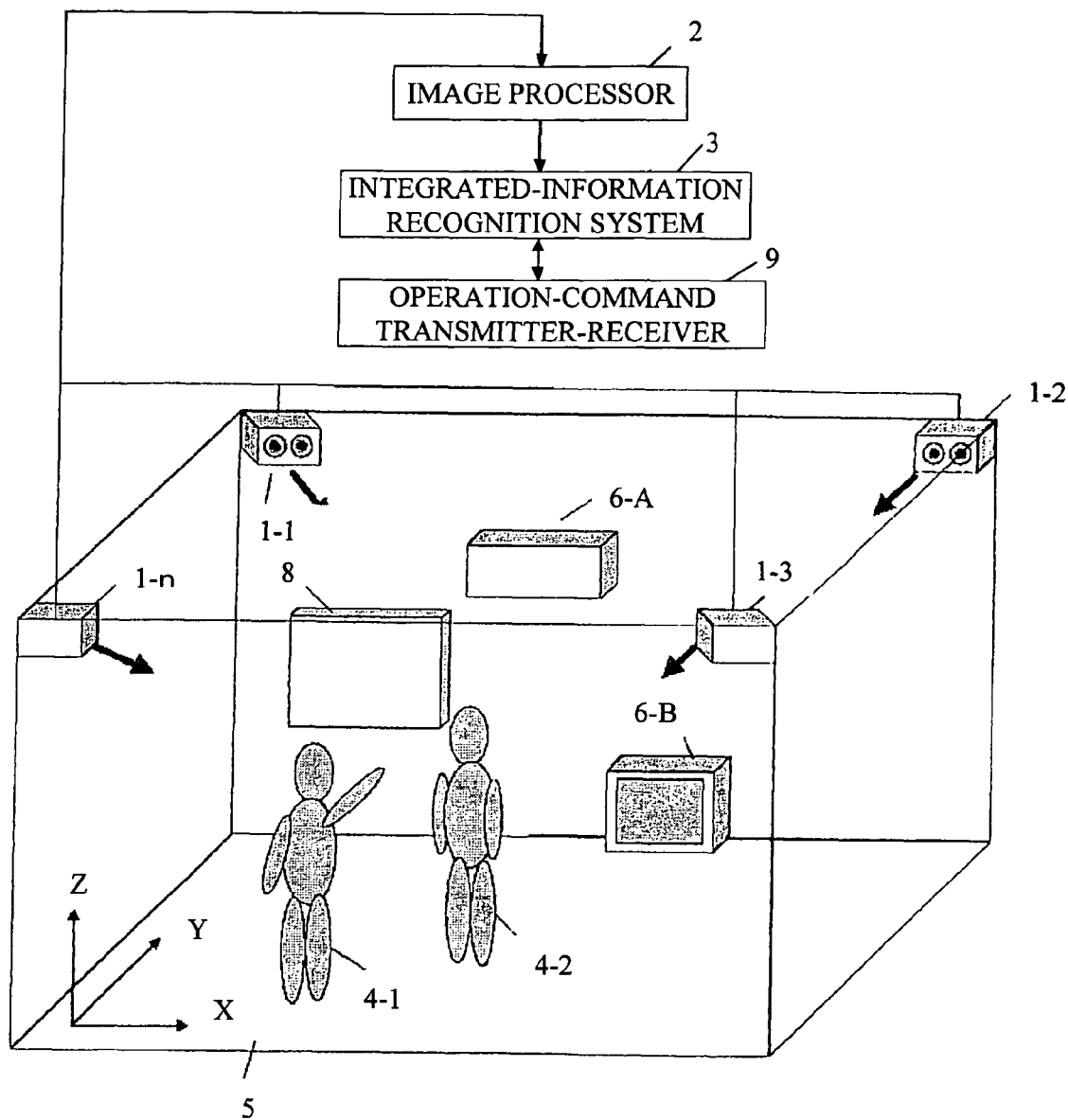
FIG. 3 is a diagram showing the configuration of a system according to an embodiment of the invention.
Figure 4:
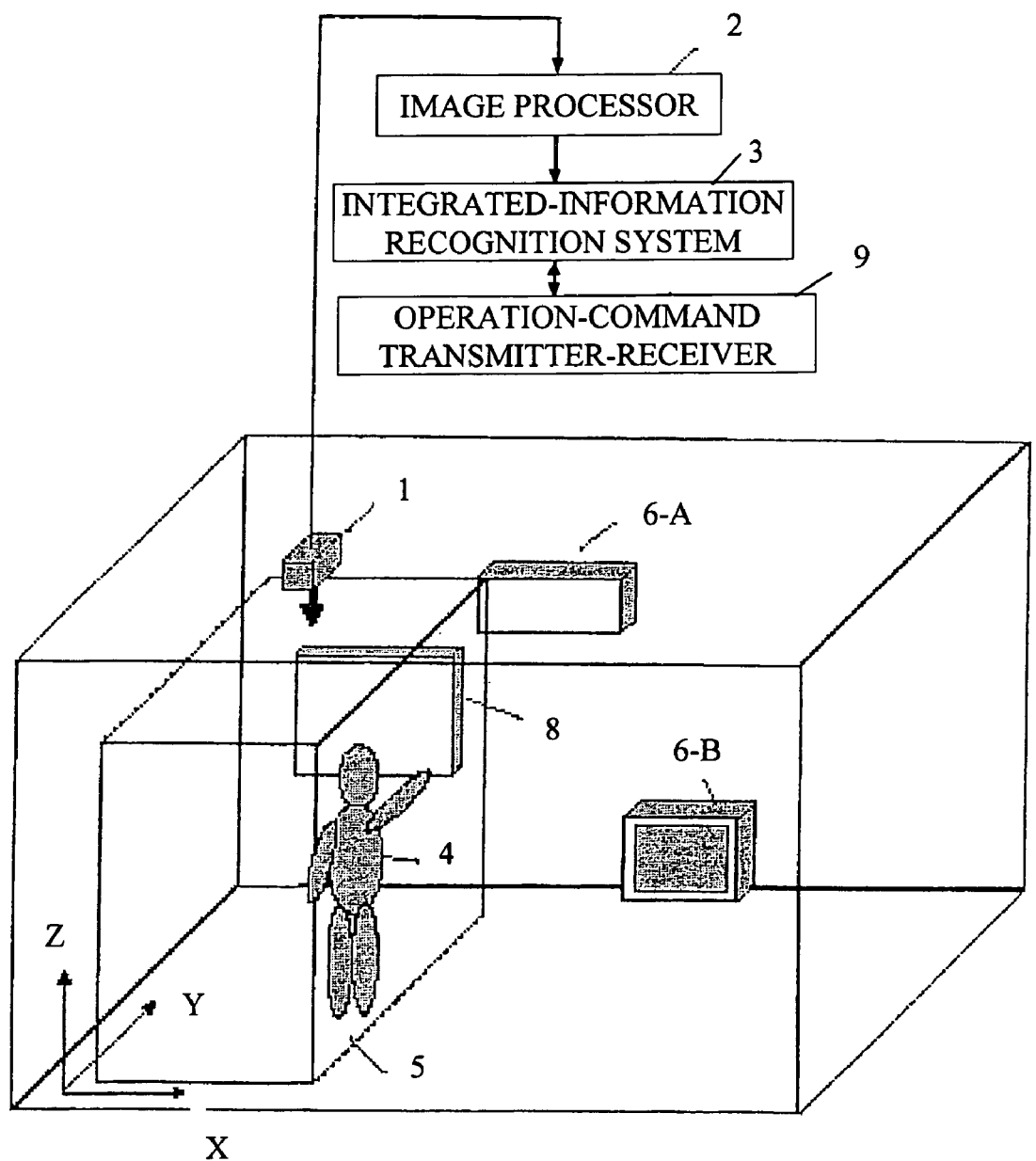
FIG. 4 is a diagram showing the configuration of a system according to an embodiment of the invention.
Figure 5:
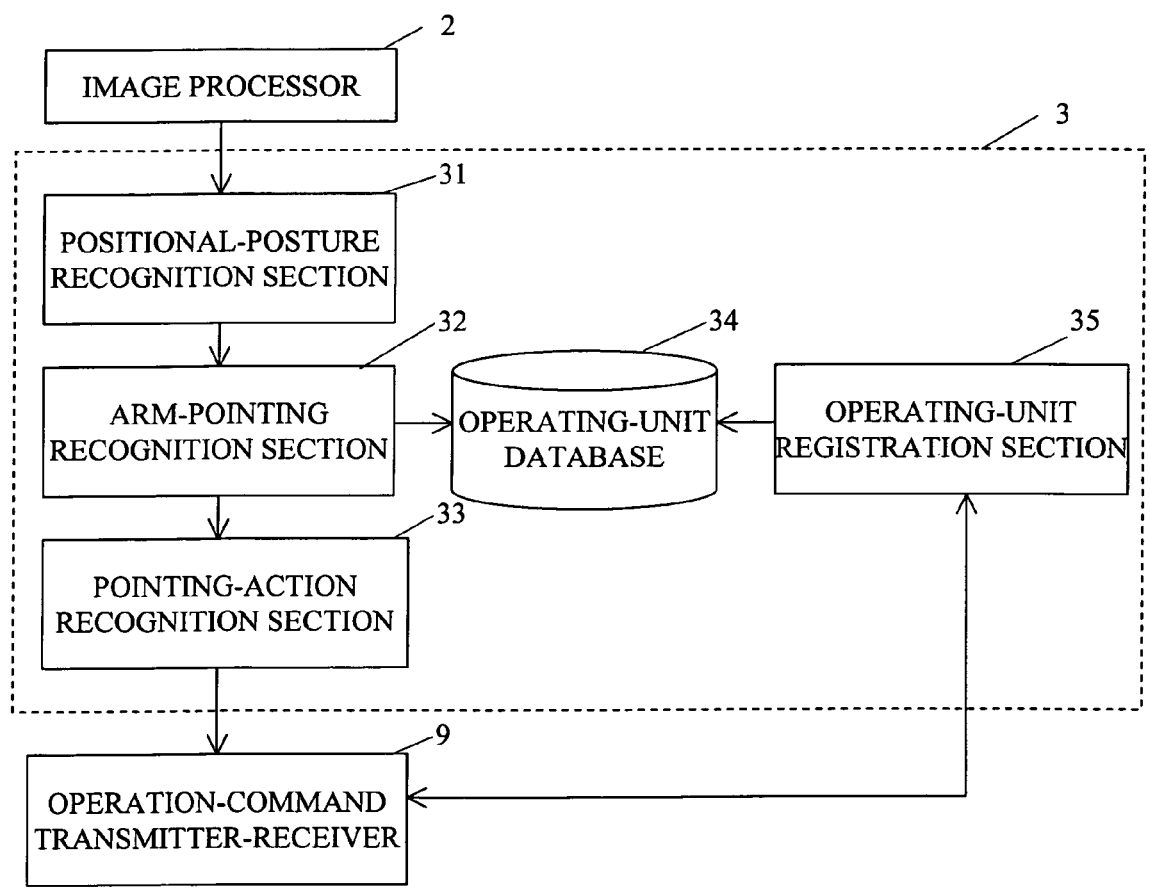
FIG. 5 is a block diagram of an integrated-information recognition system shown in FIGS. 3 and 4.

FIGS. 3 and 4 are diagrams showing the configuration of a system according to an embodiment of the invention. FIG. 5 is a block diagram of the integrated-information recognition system shown in FIGS. 3 and 4.

Referring to FIG. 3, an indoor space 5 is photographed by a plurality of stereo cameras 1-1 to 1-n so as to leave no blind spot, and users 4-1, 4-2 to 4-n move freely in the indoor space 5. Two or more image-pickup devices are fixed to each of the stereo cameras 1 in parallel. The image pickup outputs from the stereo cameras 1-1 to 1-n are delivered to an image processor 2. The stereo cameras 1 themselves are of a known type, such as Digiclops produced by Point Grey Research Inc., or Acadia produced by David Sarnoff Research Center.

The image processor 2 processes images from the stereo cameras 1 as inputs, at a rate of about 10 to 30 images per second, and delivers the results of color images and distance images obtained to an integrated-information recognition system 3. Numeral 6 denotes an operation object unit, which includes an air conditioner 6-A and a TV set 6-B. Numeral 8 indicates a display.

FIG. 3 shows an example in which all the indoor space is covered as a recognition object region (operable space) 5; in FIG. 4, only one of the stereo cameras 1 is placed downward and only the indoor space thereunder is shown as the recognition object region (operable space) 5. While in the operable space 5 of FIG. 4 only one user 4 is shown as an object, the fundamental system is similar to that shown in FIG. 3.

Referring to FIG. 5, the integrated-information recognition system 3 includes a positional-posture recognition section 31, an arm-pointing recognition section 32, a pointing-action recognition section 33, an operating-unit database 34, and an operating-unit registration section 35. The positional-posture recognition section 31 extracts distance data from three-dimensional information collected by the image processor 2 along the indoor-space coordinate system (the X-, Y-, Z-axes in FIGS. 3 and 4) by the different-level extracting method shown in FIG. 7 and projects the data onto two-dimensional planes, thereby performing posture recognition process for multiple users. The arm-pointing recognition section 32 identifies the direction of the arm pointing from the obtained two-dimensional projection drawings of the multiple users. The pointing-action recognition section 33 recognizes the pointing action from the obtained time-series data of the arm-pointing direction. The operating-unit database 34 stores the information on the operation object unit 6 that is an object of arm-pointing operation and an operation method. The operating-unit registration section 35 stores the basic information, position, and operation method of the operation object unit 6.

Referring to FIGS. 3, 4, and 5, an operation-command transmitter-receiver 9 operates the operation object unit 6 by transmitting an operation command to the operation object unit 6 determined by the integrated-information recognition system 3 and receiving it with the operation object unit 6. At the same time, the operation-command transmitter-receiver 9 receives necessary information from the operation object unit 6. The method for transmitting and receiving the operation command includes communication methods using weak electric waves having no directivity, such as Bluetooth and ECHONET.

While FIGS. 3 and 4 show the embodiment of the interface apparatus in a room, the invention is not limited to this embodiment. For example, the invention can also be applied to any case in which a pointing action is used, for example, in factories or public space, in place of the indoor space.

Figure 6:
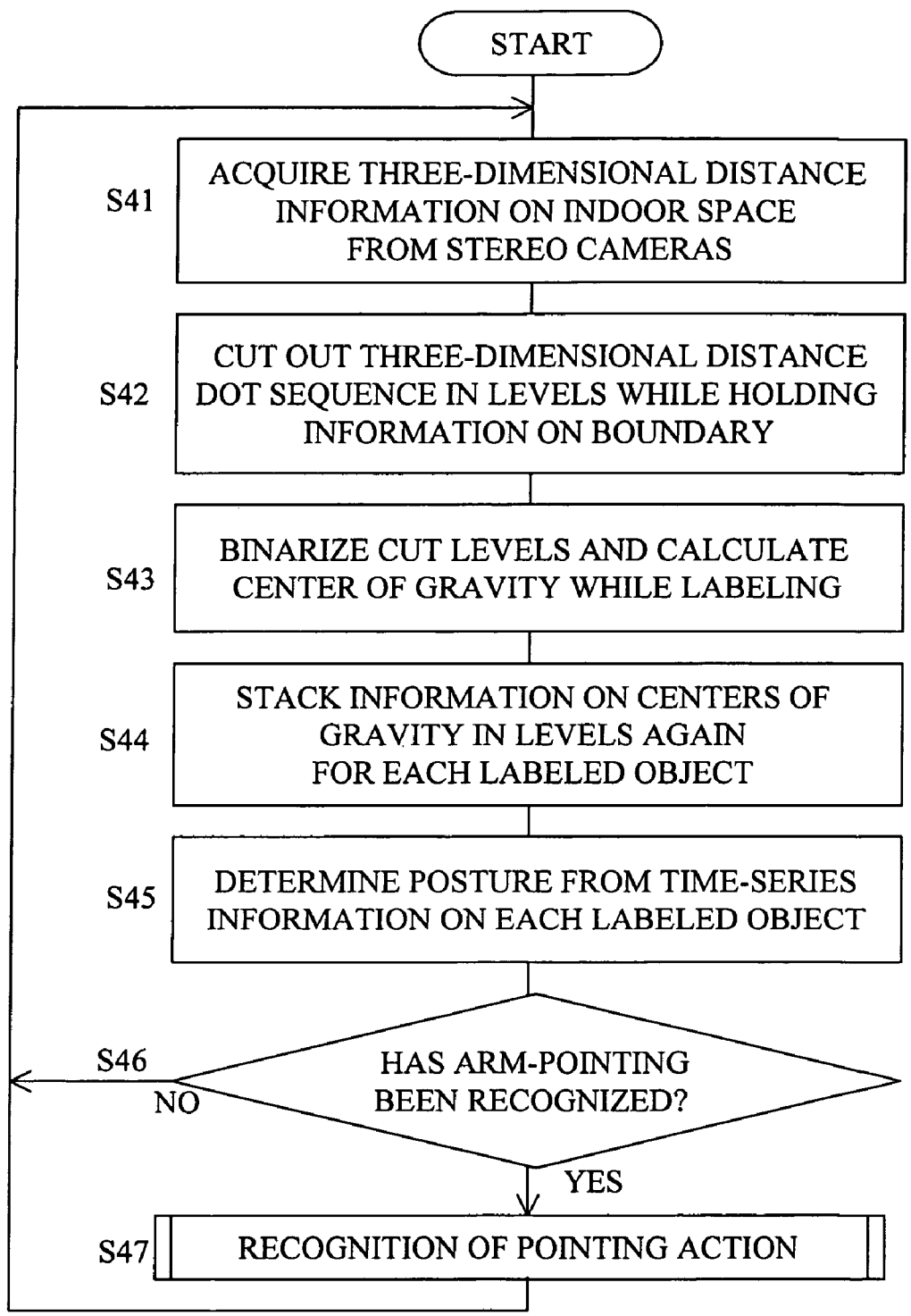
FIG. 6 is a flowchart for the operation of the embodiment of the invention.

FIG. 6 is a flowchart for the operation of the embodiment of the invention, describing part of FIG. 5 in detail.

All the users 4-1 to 4-n who go in and out of the indoor space 5 of FIG. 3 are photographed by the stereo cameras 1-1 to 1-n, and the image-pickup outputs are delivered to the image processor 2. That is, the behaviors of persons who go in and out of this indoor space 5 are all photographed and monitored after entering the room until going out, according to the flow of FIG. 6.

The image processor 2 produces distance information based on the color images within the visual field in units of camera and the coordinate system of the room, and delivers the information to the integrated-information recognition system 3. The coordinate system X, Y, and Z (FIGS. 3 and 4) common to all the stereo cameras 1-1 to 1-n is preset.

Figure 7:
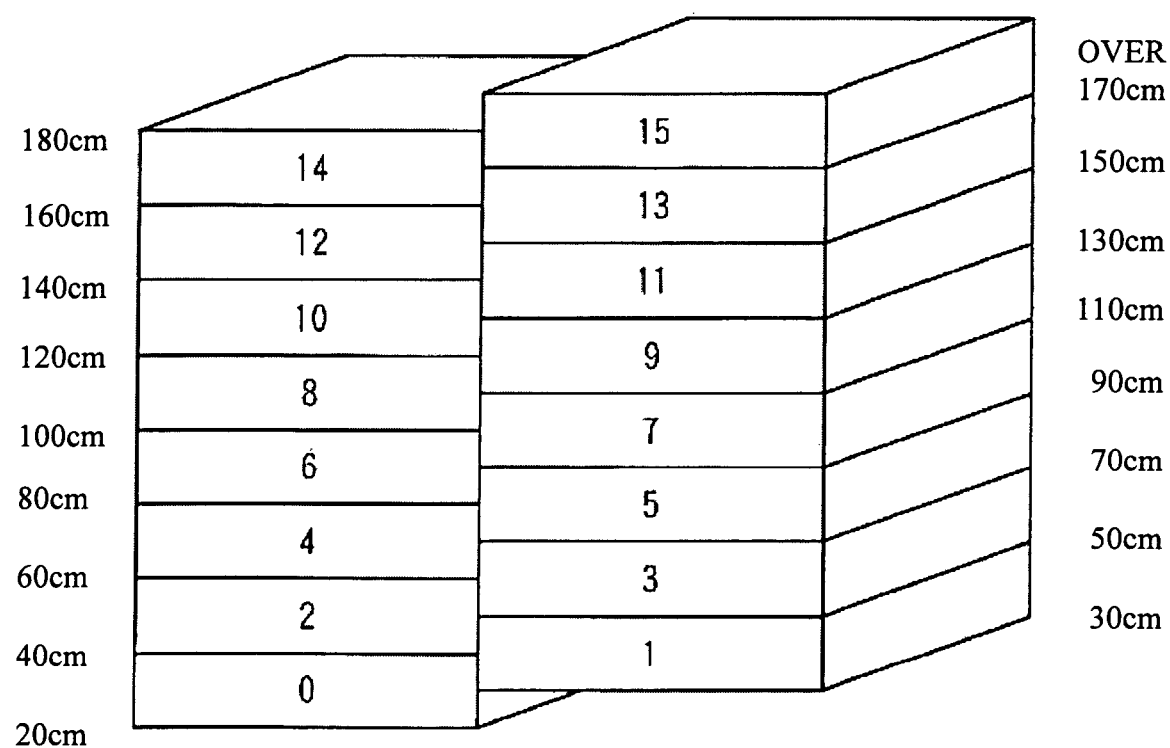
FIG. 7 is an explanatory diagram of a different-level extracting method used in the invention.

The three-dimensional distance information (X, Y, Z) acquired from the stereo cameras 1-1 to 1-n in step S41 is not operated as a whole but is divided into levels by 20 cm according to the indoor coordinate system to cut out three-dimensional distance dot sequences, as shown in FIG. 7. To prevent information from being lost in the boundary, the information is cut again with a displacement of 10 cm and as such, the continuous three-dimensional distance dot sequences can be cut out without a loss in information (step S42).

Figure 8:
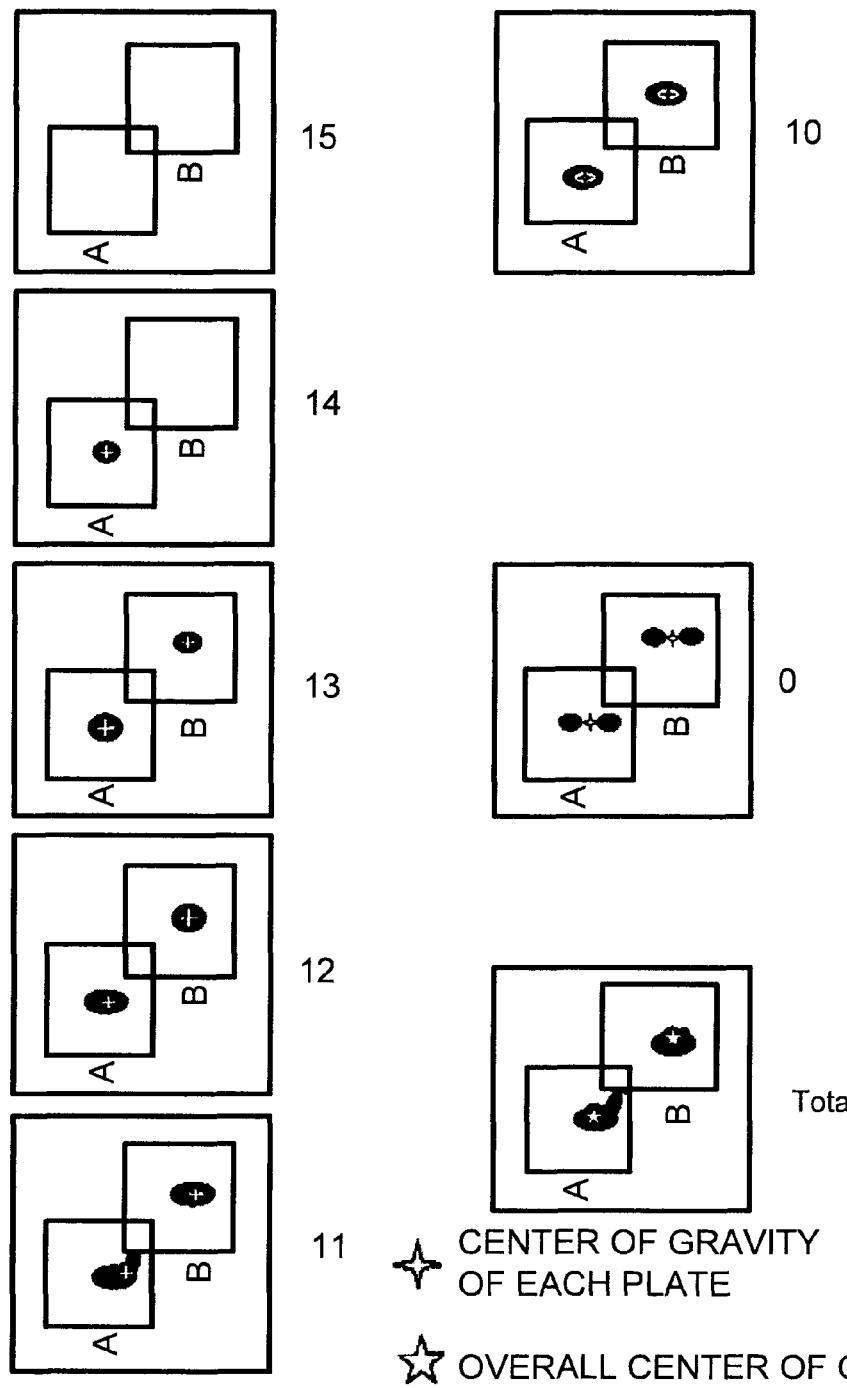
FIG. 8 is an explanatory diagram (1) of a posture-recognition processing method used in the invention.

Then, as shown in FIG. 8, the dot sequence in each level (0 to 15 in FIG. 7) is projected onto a two-dimensional plane and is then binarized. Thus, the information in each level is brought into a two-dimensional binary image. It is labeled on a level-to-level basis (two users are labeled as A and B in FIG. 8) and thereafter the overall center of gravity of each cluster (the center ☆ in "Total" of FIG. 8) is determined (step S43). Thus multiple persons can be processed by being labeled initially.

Figure 9:
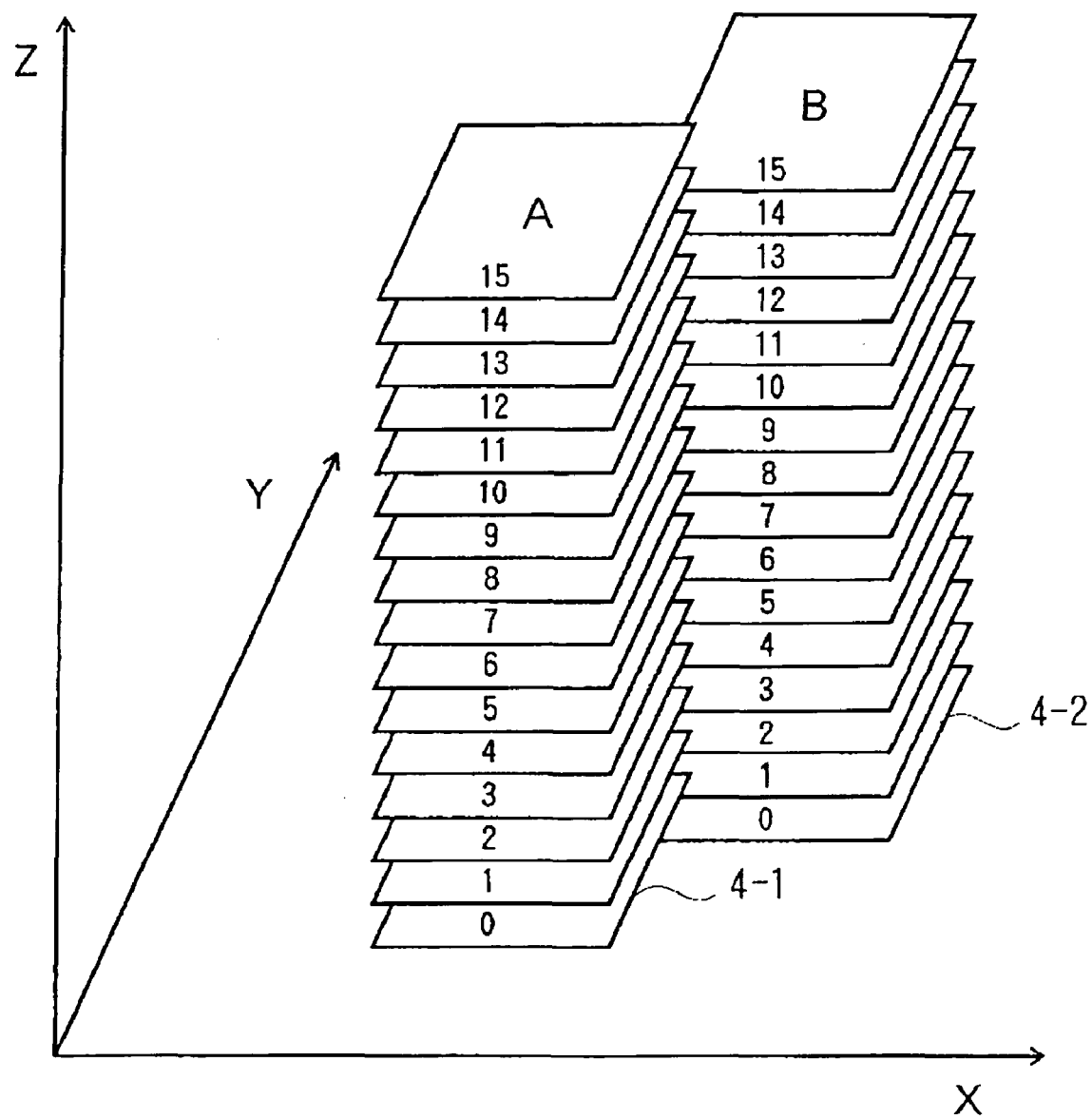
FIG. 9 is an explanatory diagram (2) of the posture-recognition processing method used in the invention.

Referring next to FIG. 9, the centers of gravity determined in the two-dimensional planes are stacked again in levels for each of the labeled object and they are used as a three-dimensional dot sequence (step S44).

Figure 10:
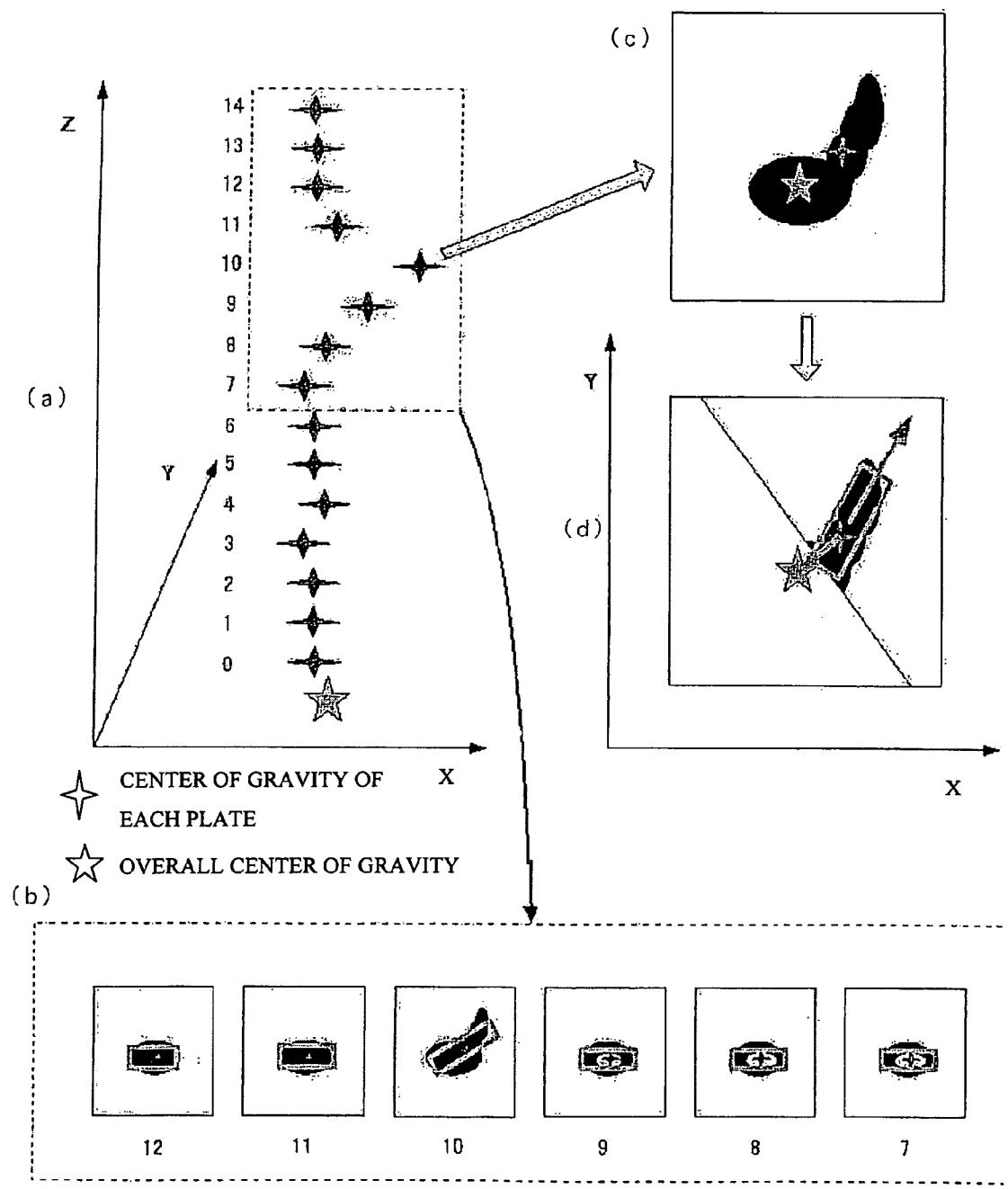
FIGS. 10(a)-10(d) are explanatory diagrams (3) of the posture-recognition processing method used in the invention.
Figure 11:
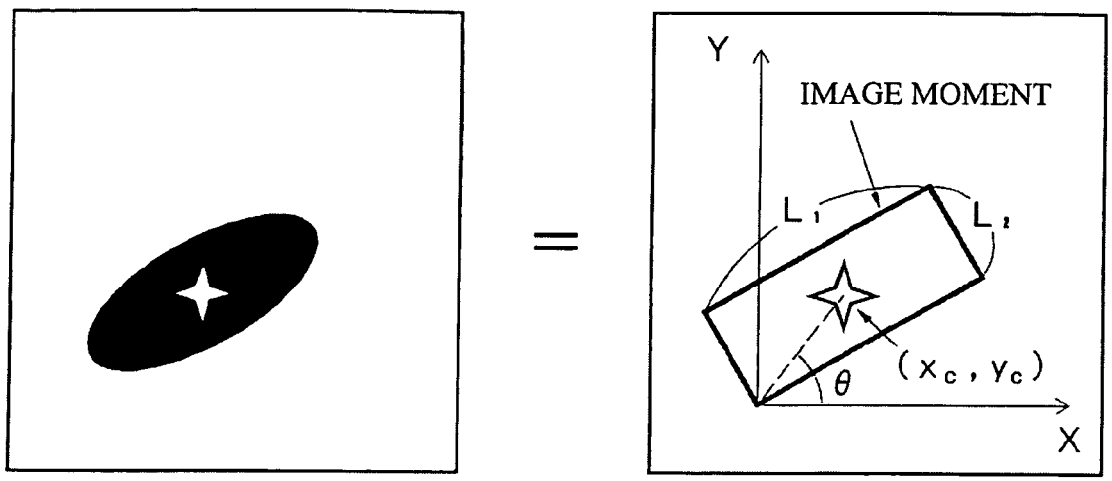
FIG. 11 is an explanatory diagram (4) of the posture-recognition processing method used in the invention.

Referring to FIG. 10($a$), the center of gravity of each level is plotted along the Z-axis (along the height), in which those of eight levels (corresponding to the upper half of a body) from the uppermost level (the head) are plotted on the X-Y plane, wherein when there is a large outlier, it is determined that an arm-pointing action has been made. To measure the direction of the body at the same time, the image moments of the binary images of eight levels from the uppermost are calculated, as shown in FIG. 10($b$) (only those of six levels are shown in FIG. 10($b$)). The image moment denotes a rectangle equivalent to the binary image, shown in FIG. 11, and the center of gravity of the rectangle (xg, yg), slope θ, long side L1, short side L2 are given by equations (1).

$$\text{Center of Gravity } x_c = \frac{M_{10}}{M_{00}} \qquad (1)$$

$$\text{Center of Gravity } y_c = \frac{M_{01}}{M_{00}}$$

-continued $$\text{Slope } \theta = \frac{\tan^{-1}\left(\frac{b}{a-c}\right)}{2}$$

$$\text{Long Side } L_1 = \sqrt{6\left[a+c+\sqrt{b^2+(a-c)^2}\right]}$$

Short Side $$L_2 = \sqrt{6\left[a+c-\sqrt{b^2+(a-c)^2}\right]}$$

$$a = \frac{M_{20}}{M_{00}} - x_c^2$$

$$b = 2\left(\frac{M_{11}}{M_{00}} - x_c y_c\right)$$

$$c = \frac{M_{02}}{M_{00}} - y_c^2$$

Of the obtained eight sets of data, the vertical direction of the long side L1 of the level, whose area is within a specified range and in which the difference between the long side L1 and the short side L2 is the largest, is determined to be the direction of the body (step S45).

When an arm-pointing action has been recognized (Yes in step S46), the direction of the arm pointing is determined using the binary image of the level (FIG. 10(c)) in which the center of gravity is farthest from the overall center of gravity. Specifically, to be described later in detail, a perpendicular bisector is drawn between the overall center of gravity and the center of gravity of the level corresponding to arm-pointing and the binary image in the region corresponding to the body of the person is erased (FIG. 10(d)) to leave only the image of the arm. The image moment of the binary image of only the arm is calculated to determine the long side L1, short side L2, the center of gravity (xc, yc), and slope θ, thereby determining the direction on the X-Y plane.

Figure 12:
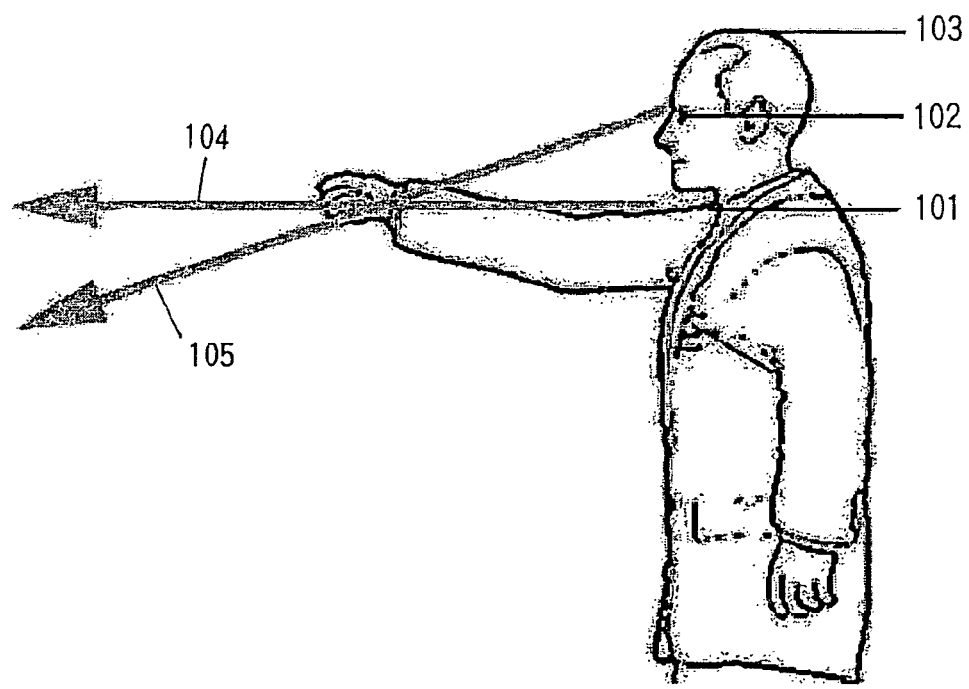
FIG. 12 is an explanatory diagram (arm-pointing diagram 1) for the operation of an embodiment of the invention.

The Z-direction indicative of the height direction includes no information on the vertical direction because the angle α of the arm acquired from the three-dimensional distance information is projected on the horizontal plane. Thus the angle αV of the arm in the vertical direction is determined by equation (2).

$$\alpha_v = \sin^{-1}\left(\frac{h_{eye} - h_{arm}}{lh}\right) \quad (2)$$

where h is the stature, heye is the height of the eyes, harm is the height of the arm, and l is an arm length coefficient.

Where the base of the direction is not the height of the shoulder joint but the height of the eyes, heye. This is because, as shown in FIG. 12, it is often observed by actual observation that a person points an object with the arm in the direction of the line between the eyes and the tip of the finger, not in the direction 104 of the arm itself. The height of eyes, heye 102, is obtained by subtracting 10 cm from the height of the head, 103 (stature h). The average of Japanese adults, 0.4, is used as the arm-length coefficient l. In FIG. 12, numeral 101 denotes the height of the shoulder and numeral 105 indicates the direction of arm pointing.

Figure 13:
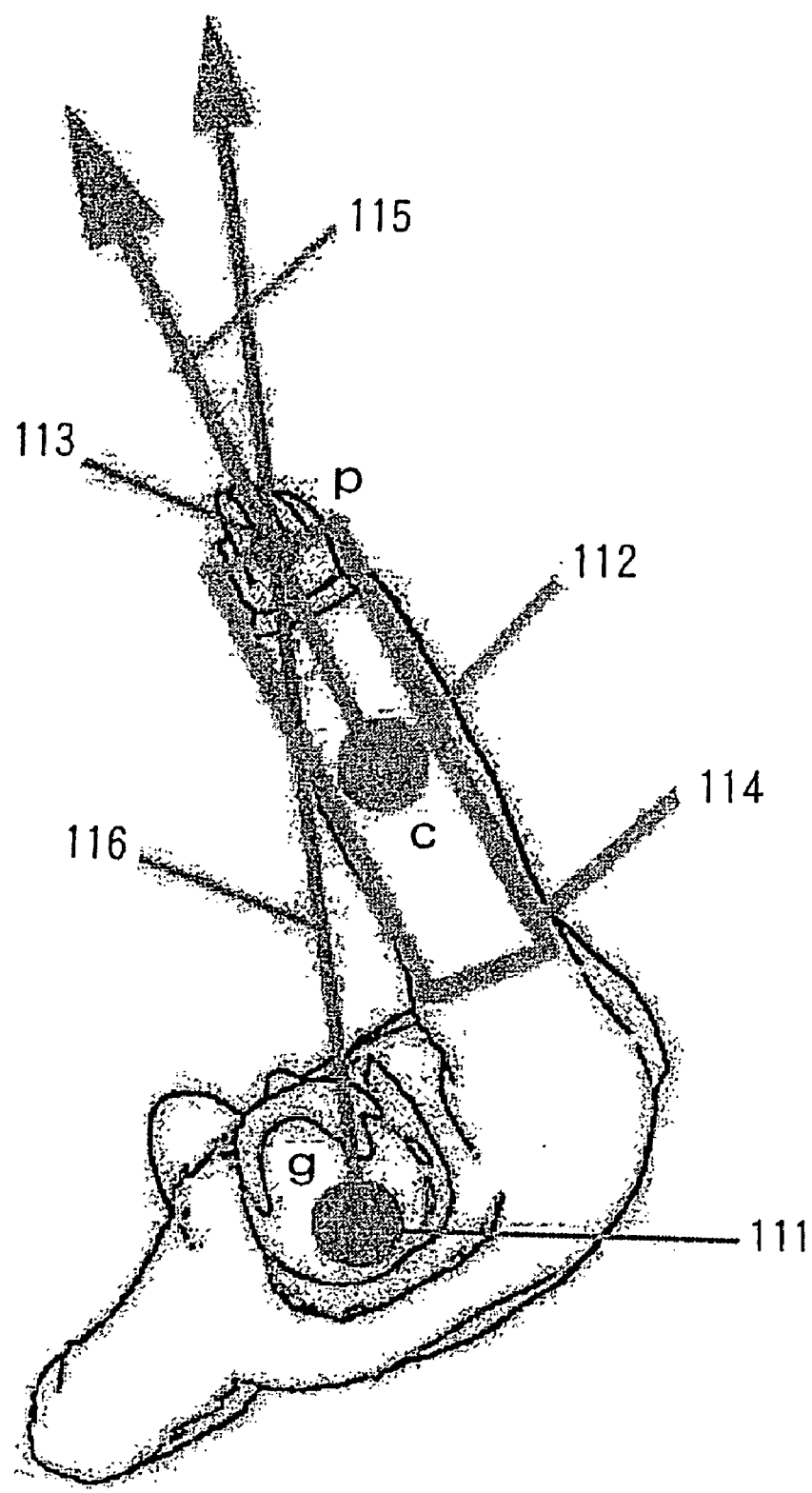
FIG. 13 is an explanatory diagram (arm-pointing diagram 2) for the operation of an embodiment of the invention.

Also the horizontal direction of arm pointing is determined from the positional relationship between the position of the eyes and the distal end of the arm. As shown in FIG. 13, g is the position (xg, yg) of the average center 111 of gravity of a person, c is the position (xc, yc) of the center 112 of gravity of the arm, p is the position (xp, yp) of the distal end of the arm 113, αh is the horizontal direction 115 of the arm, and L1 is the long side of the image moment (arm body) 114 obtained in FIG. 10(d). Where the horizontal direction αh 115 of the arm pointing is obtained from equation (3).

$$x_p = x_c + \frac{L_1}{2}\cos\alpha \quad (3)$$

$$y_p = y_c + \frac{L_1}{2}\sin\alpha$$

$$\alpha_h = \tan^{-1}\left(\frac{y_p - y_g}{x_p - x_g}\right)$$

Referring to FIG. 13, numeral 116 indicates the direction of arm pointing.

The three-dimensional direction of arm pointing is thus determined to allow a pointing action to be recognized (step S47). To determine the direction of arm pointing, different models are not prepared for the right and left hands but a common algorithm is used.

For recognition of arm pointing, it is more important to prevent misrecognition of arm pointing (false arm pointing) that is not intended by the user rather than to accurately recognize intended arm pointing.

The following three methods are set:

a. Limiting the height for determining arm pointing.
b. Determining from the size of the image moment.
c. Determining from the history of the motion of a person.

Here the countermeasures for typical situations will be described in which the system tends to determine to be arm pointing although the user intends no arm pointing (false arm pointing).

(i) In the Case in Which the User Stretches Out His Leg (False Arm Pointing)

FIG. 12 is a schematic diagram of the case in which the user stretches out his leg. Numeral 121 denotes a chair, 122 a leg stretched forwards, 123 a lower recognition limit of arm pointing, 124 the height of the head, and 125 the sitting height.

Figure 14:
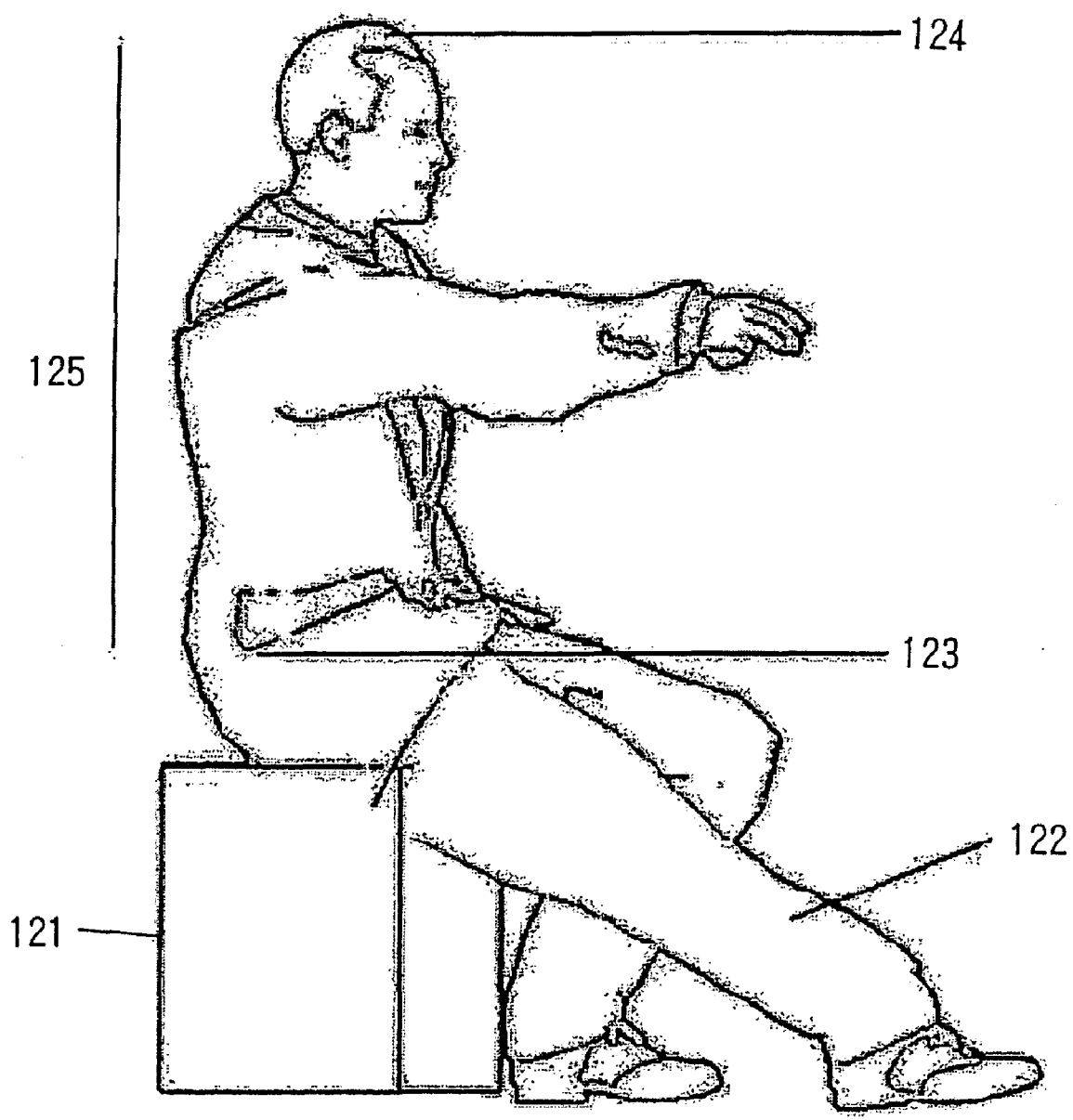
FIG. 14 is an explanatory diagram (a case in which a leg is stretched out) for the operation of an embodiment of the invention.

FIG. 14 is a schematic diagram of the case in which the user stretches out his leg. Numeral 121 denotes a chair, 122 a leg stretched forwards, 123 a lower recognition limit of arm pointing, 124 the height of the head, and 125 the sitting height.

As shown in FIG. 14, when the user sits in the chair 121 and stretches out the leg 122 forward, the three-dimensional point sequence of the stretched leg 122 resembles that of arm pointing, which may cause the system to sense arm pointing. To prevent it, restriction due to the shape of human body is used. In short, regardless of a person being in a standing or sitting position, it is obvious that the arm at arm pointing is located higher than the waist. Thus, the lower limit hmin 123 to the determination of arm pointing is obtained from the head height hhead 124 and the height hsit corresponding to the sitting height 125 by equation (4), and the detection of arm pointing at heights lower than that is ignored.

$$h_{min} = h_{head} - h_{sit} \quad (4)$$

(ii) In the Case of Slight Arm Pointing (False Arm Pointing)

Figure 15:
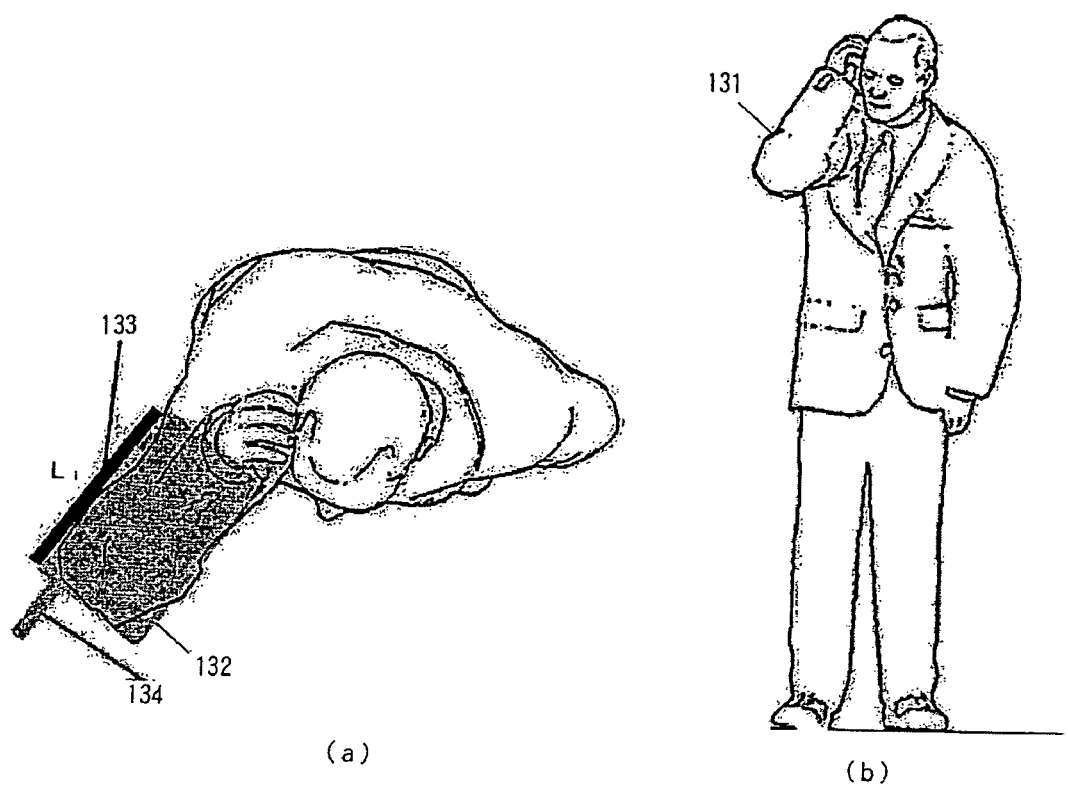
FIGS. 15(a), 15(b) are explanatory diagrams (slight arm pointing 1) for the operation of an embodiment of the invention.

FIG. 15 is a schematic diagram of slight arm pointing, FIG. 15(a) being a top view and FIG. 15(b) is a front view thereof. Numeral 131 denotes slight arm pointing, 132 an image moment, 133 the long side L1 of the image moment 132, and 134 the lower limit of the long side L1.

In the case of slight arm pointing 131 as shown in FIG. 15, wherein when a predetermined ratio of the long side L1 of the image moment 132 to the stature is not reached, it is determined not to be arm pointing.

Figure 16:
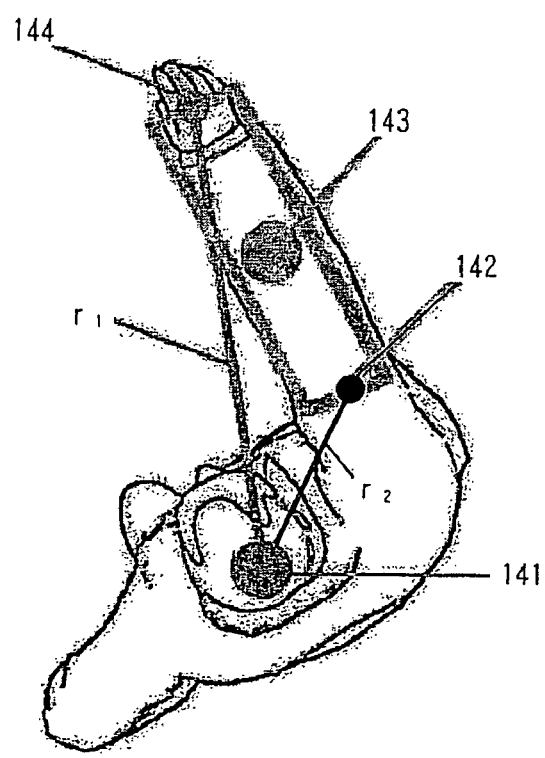
FIG. 16 is an explanatory diagram (slight arm pointing 2) for the operation of an embodiment of the invention.

Referring to FIG. 16, when r1/r2 is less than a value set from the stature, where r1 is the distance from an average center of gravity 141 to the distal end 144 of arm pointing and r2 is the distance from the average center of gravity 141 to the base end 142 of arm pointing, it is similarly determined not to be arm pointing. Numeral 143 indicates the center of gravity of the arm.

(iii) In the Case Where Both Arms are Spread Out (False Arm Pointing)

Figure 17:
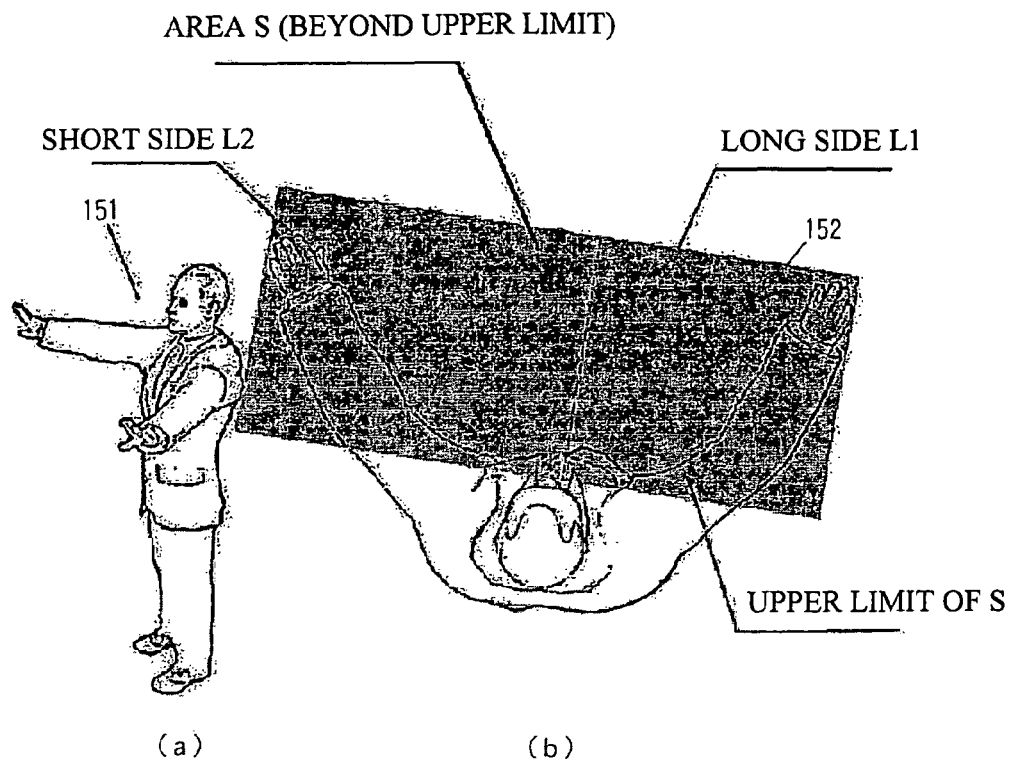
FIGS. 17(a), 17(b) are explanatory diagrams (case 1 in which both arms are spread out) for the operation of an embodiment of the invention.

FIG. 17 is a schematic diagram (1) in the case where both arms are spread out, FIG. 17(a) being a perspective view and FIG. 17(b) being a top view thereof. Numeral 151 denotes spread both arms and numeral 152 indicates the image moment when the both arms are spread out.

As shown in FIG. 17, when both arms are spread out, the area S of the image moment 152 of the spread arms is obtained from the long side L1 and the short side L2 by equation (5). The upper limit is set for the area S and the lower limit is set for the long side L1, wherein when the area S has exceeded the upper limit, or the long side L1 has fallen below the lower limit, it is determined not to be arm pointing and so ignored.

$$S = L_1 L_2 \quad (5)$$

Figure 18:
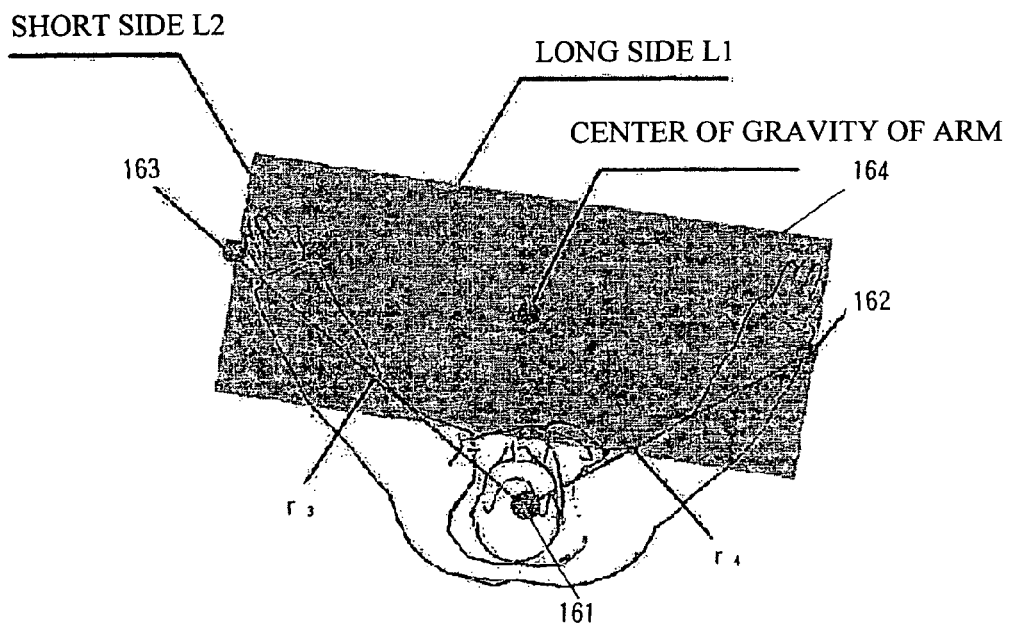
FIG. 18 is an explanatory diagram (case 2 in which both arms are spread out) for the operation of an embodiment of the invention.

FIG. 18 is a schematic diagram (2) in the case where both arms are spread out. Numeral 161 denotes an average center of gravity, 162 the base end of the arm pointing, 163 the distal end of the arm pointing, and 164 the image moment thereof.

As shown in FIG. 18, in the case of false arm pointing in which, referring to the image moment 164, the ratio of the distance r3 between the distal end 163 of the arm pointing and the average center of gravity 161 to the distance r4 between the base end 162 of the arm pointing and the average center of gravity 161 is greater than a set value, it is determined not to be arm pointing as in slight arm pointing.

(iv) In the Case Where a Partner Stands by Such as when Shaking Hands (False Arm Pointing)

Figure 19:
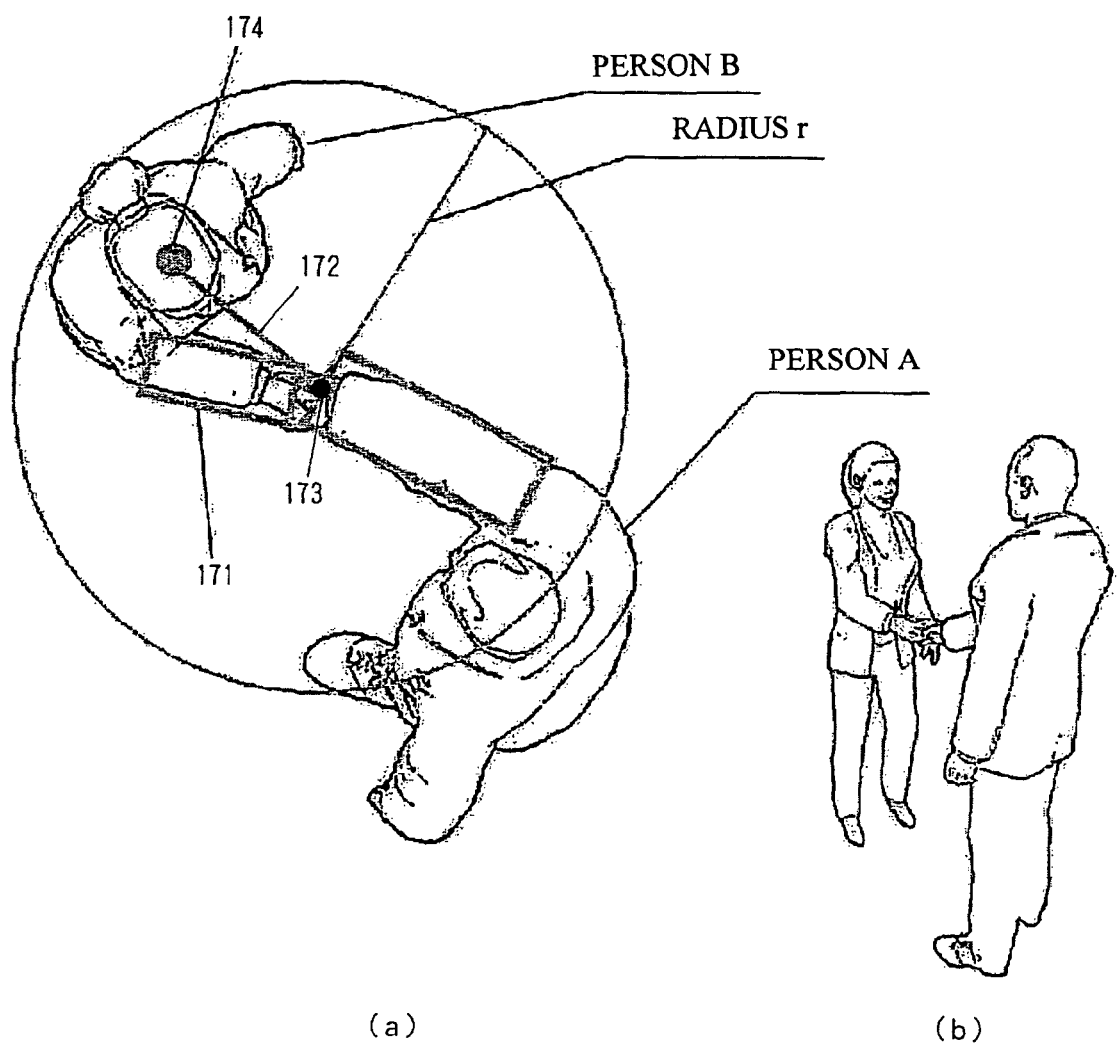
FIGS. 19(a), 19(b) are explanatory diagrams (a case in which a partner stands by such as shaking hands) for the operation of an embodiment of the invention.

FIG. 19 is a schematic diagram of the case in which a partner stands by the person such as when shaking hands, FIG. 19(a) being a top view and FIG. 19(b) being a perspective view thereof. Numeral 171 denotes the slight arm pointing of the partner, 172 the direction of the arm pointing, 173 the distal end of the arm pointing, and 174 an average center of gravity of the partner.

As shown in FIG. 19, in the case where the partner is present in the immediate area of the person such as when shaking hands, wherein when the average center of gravity 174 of the partner is found within a specified radius r around the distal end 173 of the arm pointing, it is determined not to be arm pointing.

(v) In the Case of Making a Polite Bow (Deep Bow) from the Waist (False Arm Pointing)

It is determined not to be an arm by using the setting of the upper limit of the area S by equation (5) and is also determined that the head is brought down from the change in the height of the head at the detection of arm pointing.

To prevent unintended misoperation of the user, a preaction (trigger action) is set before operation. The trigger action is an action to spread the arm toward an operation object for a specified time. After an operation object is determined by the action, the object is controlled by using the following arm-pointing gesture. The accuracy of determination of the arm-pointing object is increased by determining the direction of arm pointing by using the time during trigger operation. However, determination before the arm points the operation object will cause a loss in accuracy. Accordingly, no determination is made for several frames from the detection of arm pointing. Thereafter, the destination of arm pointing is specified for each frame from the center of gravity of the arm and the direction of the arm while the arm pointing is continued. One that matches the foregoing and has reached the set threshold s is determined to be an operation object. The threshold s is obtained using equation (6) where T is the time until the trigger is recognized, Ttrans is the time to transit to arm pointing, f is the frame rate of the system, and Ttat is the turn around time of the actual system.

$$s = \frac{(T - T_{trans} - T_{tat})}{f} \quad (6)$$

According to the invention, the user 4 makes an arm pointing action in a predetermined area of the indoor space 5 and as such, the arm pointing in the specified area is recognized, allowing the operation of a specified device. For example, with the periphery of a head part on a nursing bed set as a specified area, the action there can be distinguished from that in the other areas in the indoor space.

Figure 20:
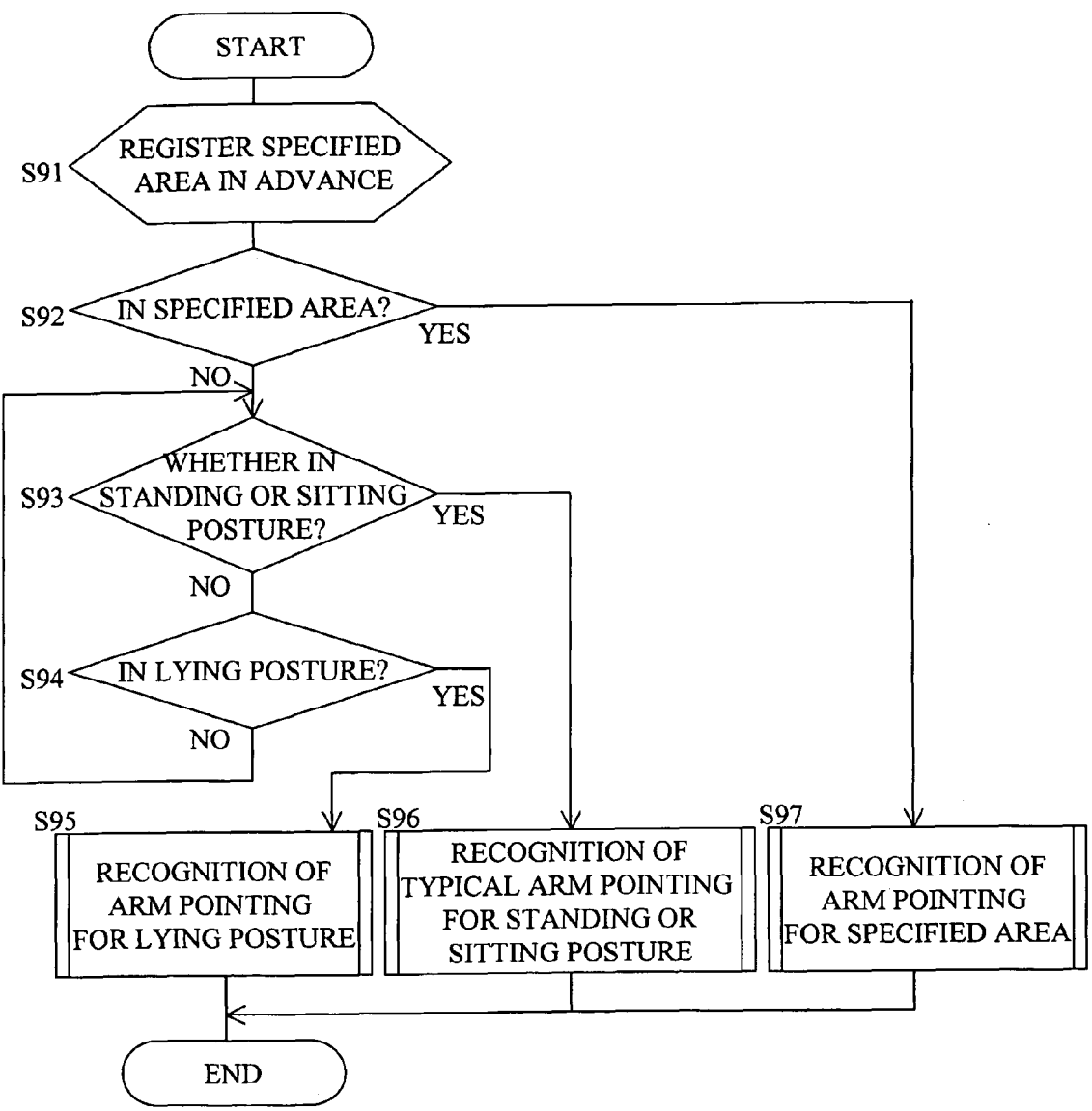
FIG. 20 is a flowchart for the identification of actions of an embodiment of the invention.

FIG. 20 is a flowchart for describing the distinction of actions.

A specified area in the indoor space 5 is first registered in advance (step S91). It is checked whether the user 4 is present in the specified area (step S92). When it is determined from time series information of the user 4 that is brought into three dimensions according to the procedure shown in FIGS. 7 to 10 (Yes in step S92), recognition of arm pointing for the specified area is made in step S97. When the user 4 is present outside the specified area (No in step S92), information on the height of the slices is determined to check whether the user 4 is in a standing or sitting posture (step S93). When the user 4 is in a standing or sitting posture (Yes in step S93), general arm-pointing recognition for the standing or sitting posture is performed in step S96. When the user 4 is in neither the standing nor sitting posture (No in step S93), it is determined in step S94 whether the user 4 is in a lying posture. When it is determined in step S94 from the range of the distance images to be in a lying posture (Yes in step S94), recognition of arm pointing for the lying posture is made in step S95. The steps S95 to S97 correspond to the operation of the arm-pointing recognition section 32. When it is determined that the user 4 is outside the specified area and is not in any of the standing, sitting, and lying-down postures (No in step S94), the procedure returns to step S93 to continue the recognition of the posture.

Figure 21:
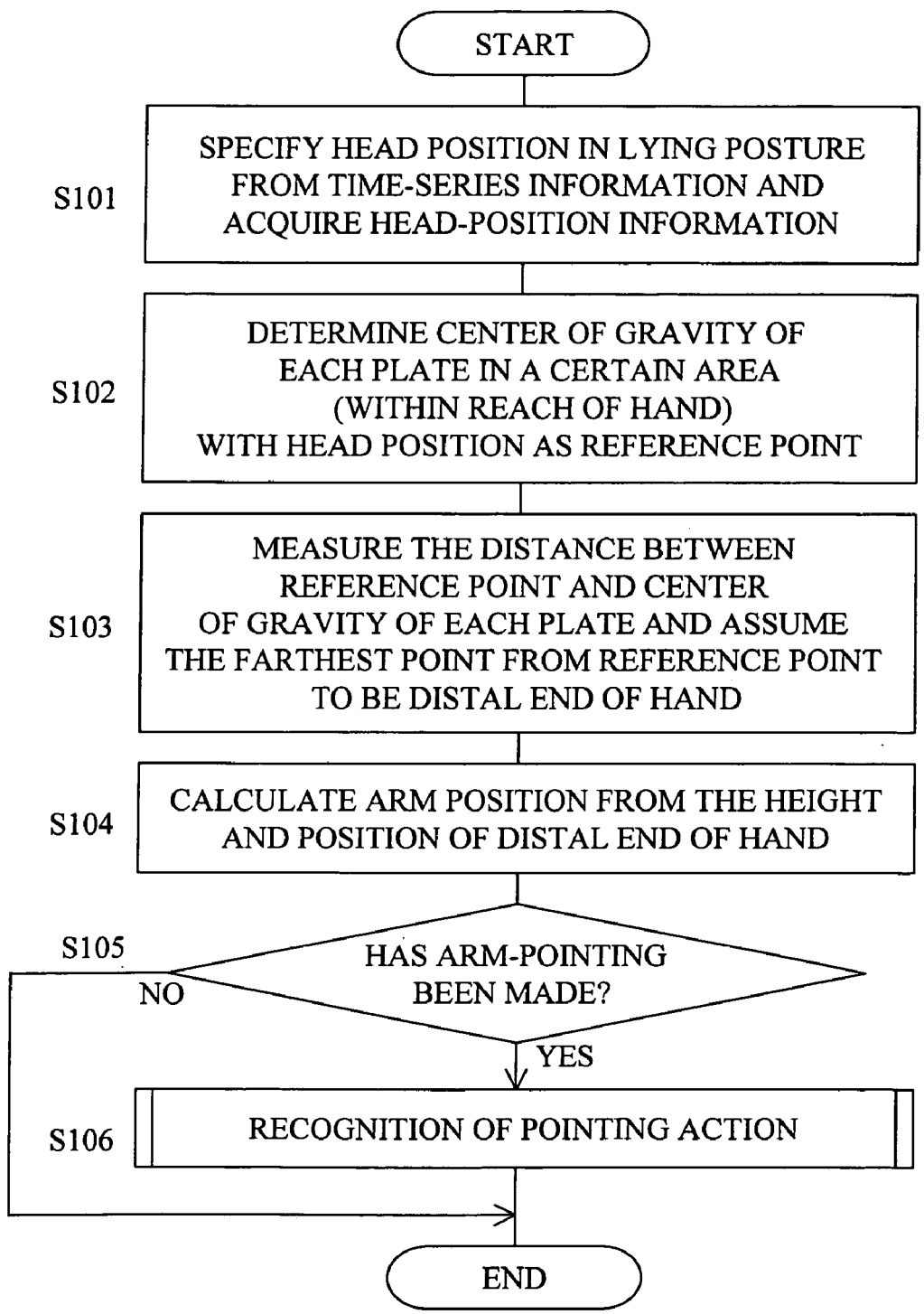
FIG. 21 is a flowchart for details of part of the operation of the arm-pointing recognition section in FIG. 20 for a lying posture.

FIG. 21 is a flowchart for the details of part of the operation of the arm-pointing recognition section 32 for a lying posture.

In step S101, when it is determined from the time-series information on the position of the head that the user 4 is in a lying posture, information on the head position is acquired. In step S102, using the information on the head position as a reference point, plates in the range to which the hand can be spread are cut out and the center of gravity of each plate is determined. In step S103, the distance between the reference point and the center of gravity of each plate is measured and the farthest point from the reference point is assumed to be the position of the distal end of the hand. In step S104, the position of the arm is calculated from the distal end of the hand and the height of the plate, wherein when the distance from the reference point to the distal end of the hand is long, it is determined that arm pointing has been made, while when it is short, it is determined that no arm pointing has been made (step S105). Only when it is determined in step S105 that arm pointing has been made (Yes), pointing action is recognized (step S106).

Figure 22:
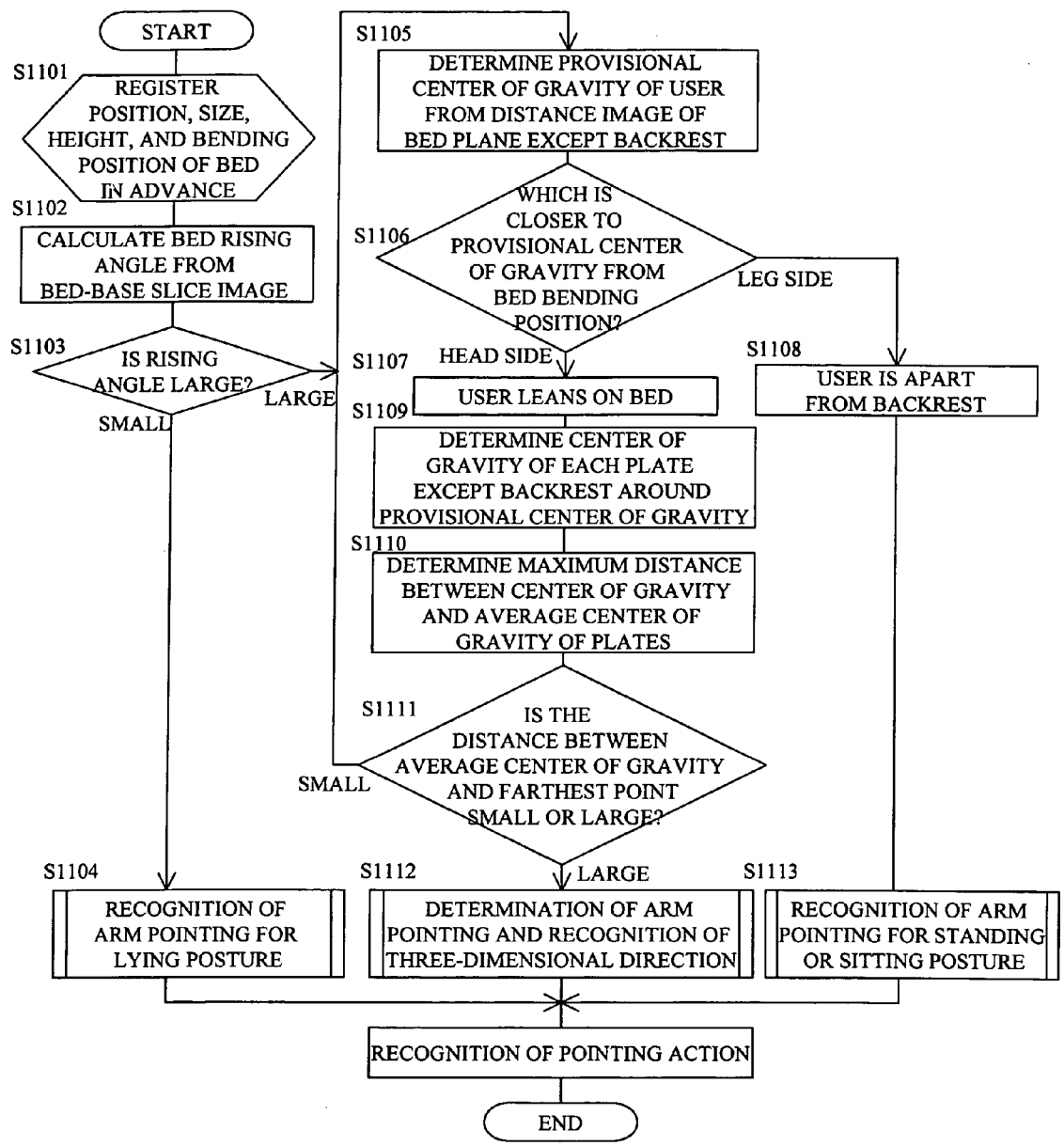
FIG. 22 is a flowchart for details of part of the operation of the arm-pointing recognition section in a specified area in the invention.

FIG. 22 is a flowchart for the details of part of the operation of the arm-pointing recognition section 32 in a specified area. Here the object is a nursing bed (reclining bed), on which recognition of arm pointing can be made in a typical sitting or lying posture irrespective of the use of a reclining function.

Figure 23:
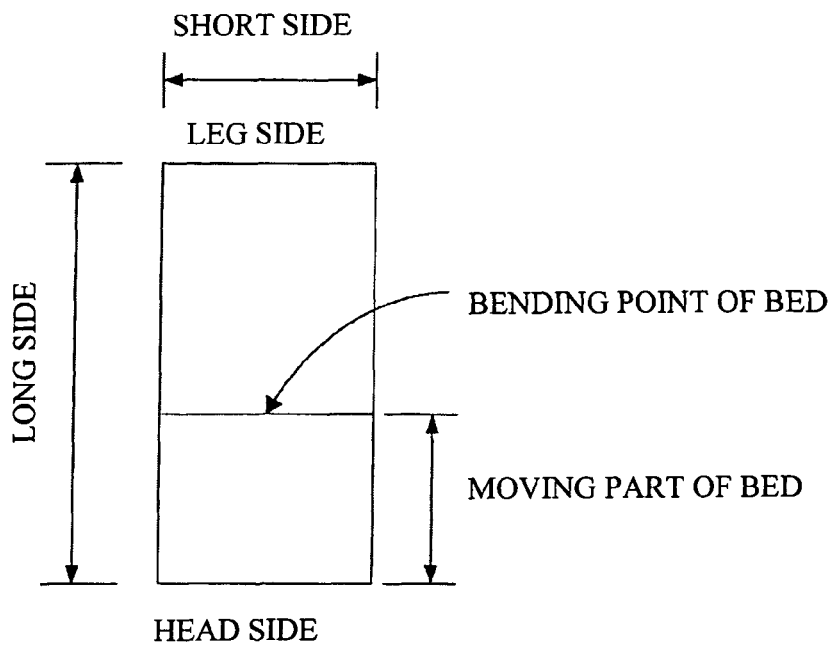
FIG. 23 is a diagram of the images of the base of a bed for calculating the rising angle of the bed.
Figure 23:
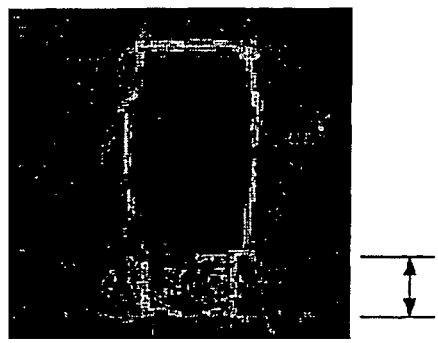
Figure 23:
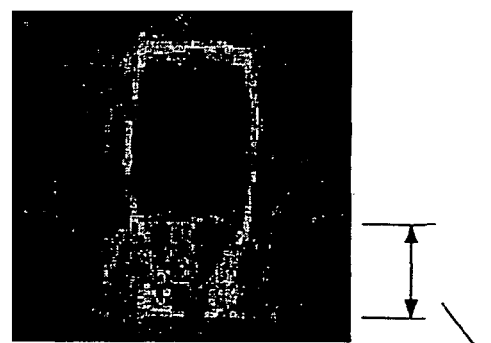

With the position of the nursing bed being set as the specified area, the position, size, height, and bending position of the bed in the indoor space 5 are registered in the operating-unit database 34 in advance in step S1101. In step S1102, the rising angle of the bed is calculated from the slice image of the base of the bed. As shown in FIG. 23, the rising angle of the bed can be determined from the size of the bed and the size of the moving part (the whitish part in the photographs) in the image of the base of the bed.

In step S1103, when it is determined from the rising angle obtained in step S1102 that the angle is small, recognition of arm pointing in the lying posture is made in step S1104 and then the recognition of pointing action is made in step S1114.

When the rising angle is large, the recognition of arm pointing particular to a nursing bed is continued. In step S1105, a provisional center of gravity of a user 4 is determined from the entire distance image on the plane of the bed except the backrest. When it is determined in step S1106 that the provisional center of gravity of the user 4 is in a position closer to the head than the bed bending position, as shown in FIG. 23, it is determined that the user 4 leans on the bed (step S1107).

On the other hand, when the provisional center of gravity is closer to the legs, it is determined that the user 4 is apart from the bed backrest (step S1108) and, in step S1113, recognition of arm pointing for a standing or sitting posture is performed as in a normal sitting posture.

When the user 4 leans on the backrest (step S1107), a given region around the provisional center of gravity of the user 4 except the backrest is cut out in step S1109, and the centers of gravity of the plates and the average center of gravity thereof are obtained. In step S1110, a plate in which the distance between the center of gravity and the average center of gravity of the plates is farthest is determined. When it is determined in step S1111 that the distance between the average center of gravity and the farthest point is large, it is determined that arm pointing is being performed, and in step S1112, the three-dimensional direction of the arm pointing is specified from the plate. When it is determined in step S1111 that the distance between the average center of gravity and the farthest point is small, it is determined that no arm pointing is being performed, and the procedure returns to step S1105, wherein the determination of arm pointing on the nursing bed is continued.

Figure 25:
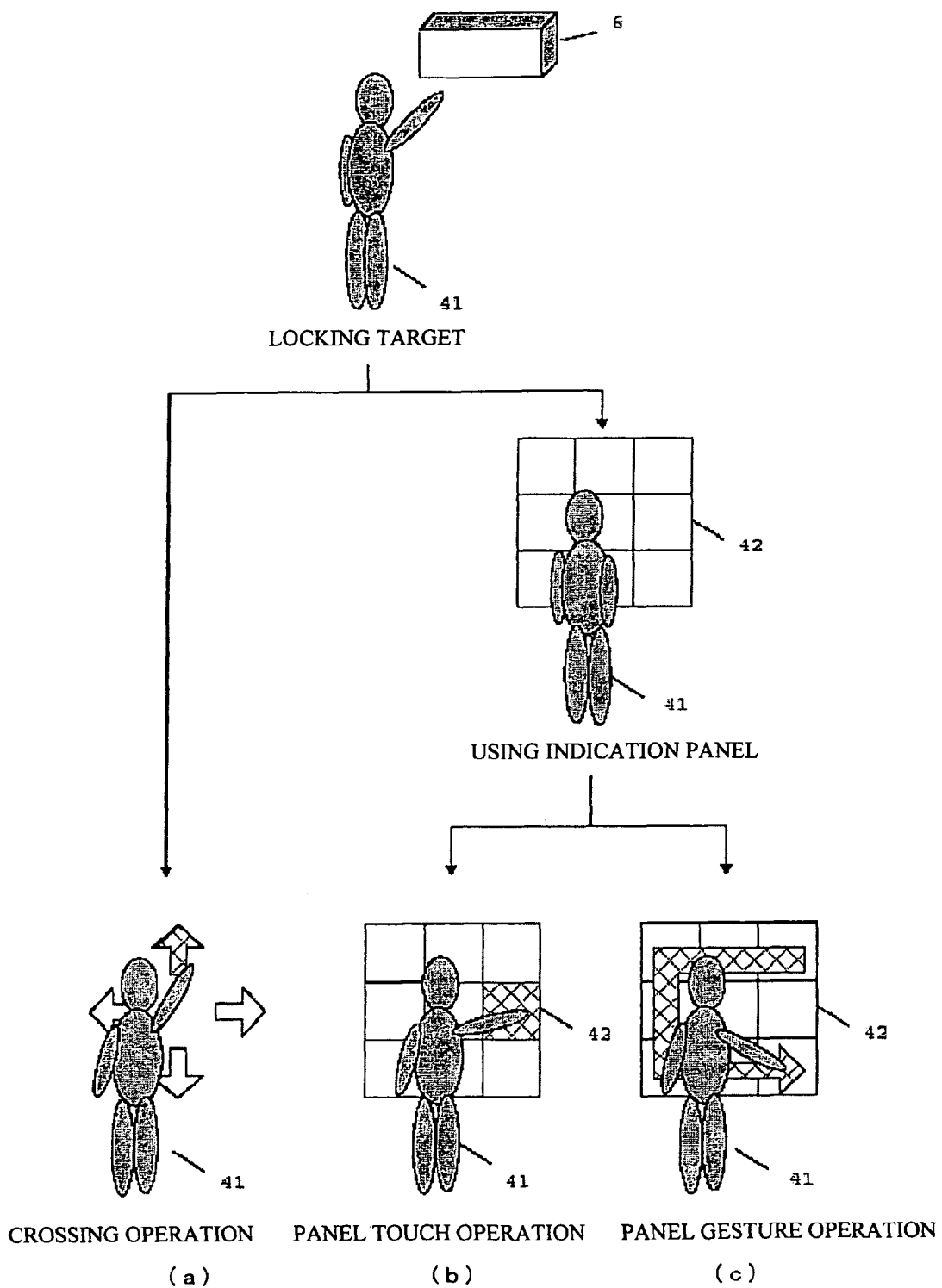
FIGS. 25(a)-25(c) are explanatory diagrams of three basic patterns of a pointing action of the invention.

FIG. 25 shows three basic patterns of a pointing action. In the case in which the state of arm pointing is recognized accurately by positional-posture recognition section and arm-pointing recognition section, wherein when an indicator 41 shown in FIG. 25 continues arm pointing to the operation object unit 6 for a fixed period of time, the target is locked to the operation object unit 6 at the destination of the arm pointing. For the pointing action after the target has been locked, three patterns of operation are provided such as a crossing operation FIG. 25(*a*), a panel touch operation FIG. 25(*b*), and a panel gesture operation FIG. 25(*c*).

Figure 26:
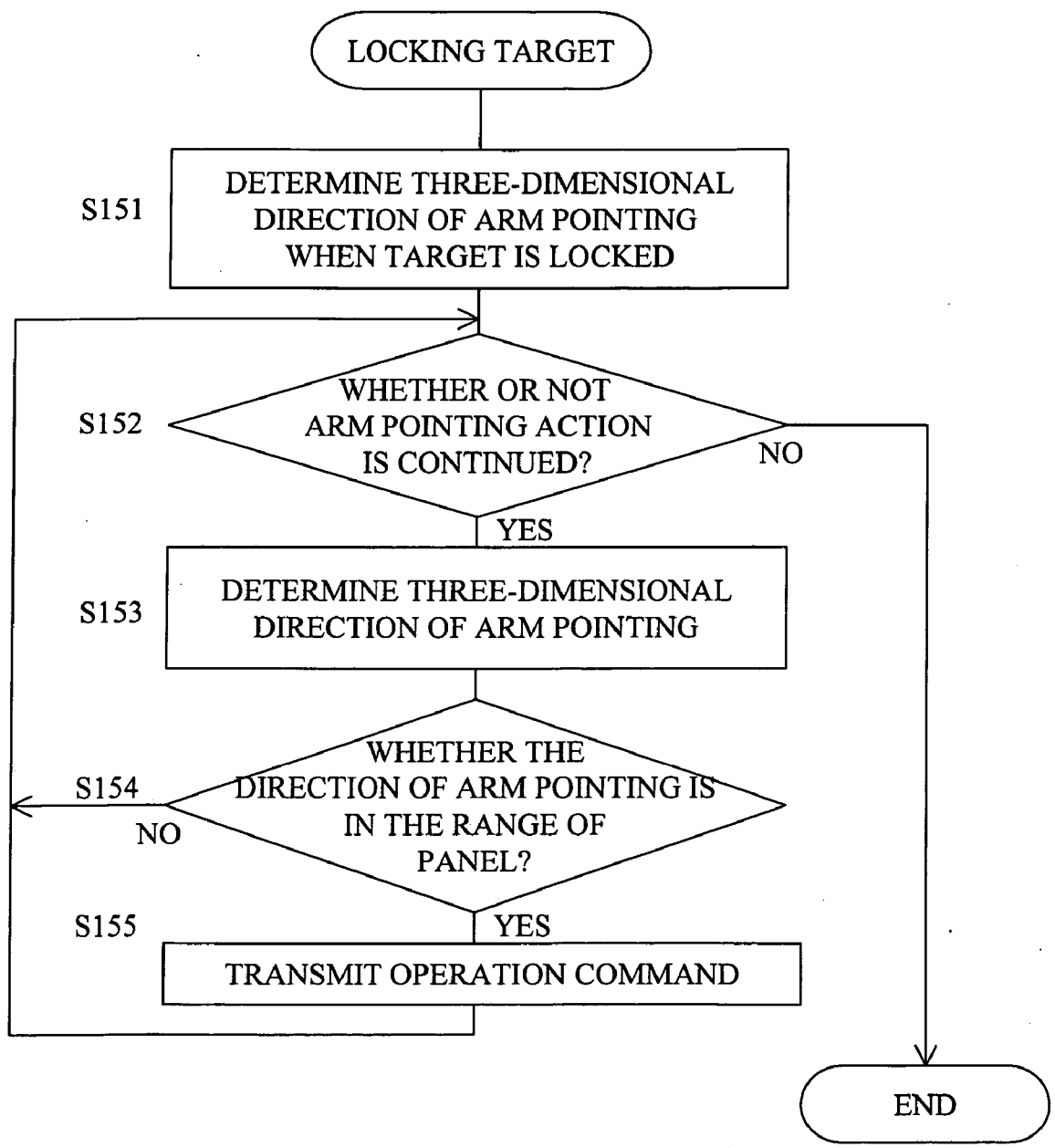
FIG. 26 is a flowchart for a crossing operation of the invention.

FIG. 26 shows a flowchart for the crossing operation. In step S151 of FIG. 26, the three-dimensional direction of the arm when the indicator 41 has locked the target is determined, which is assumed to be the origin of the crossing operation. In step S152, it is then determined whether the arm-pointing action is continued after the target lock. When the arm pointing is continued (Yes), the three-dimensional direction of the arm pointing is obtained in step S153, and then it is determined in step S154 whether the direction of the arm pointing is within the crossing action range, wherein when it is within the range (Yes), a command corresponding to the direction is transmitted continuously in step S155. On the other hand, when it is determined in step S152 that no arm pointing is performed for a fixed period of time (No), the determination on arm pointing is terminated. The crossing operation is suitable for simple operations such as turning on/off of a switch and changing of the volume and channel.

Figure 27:
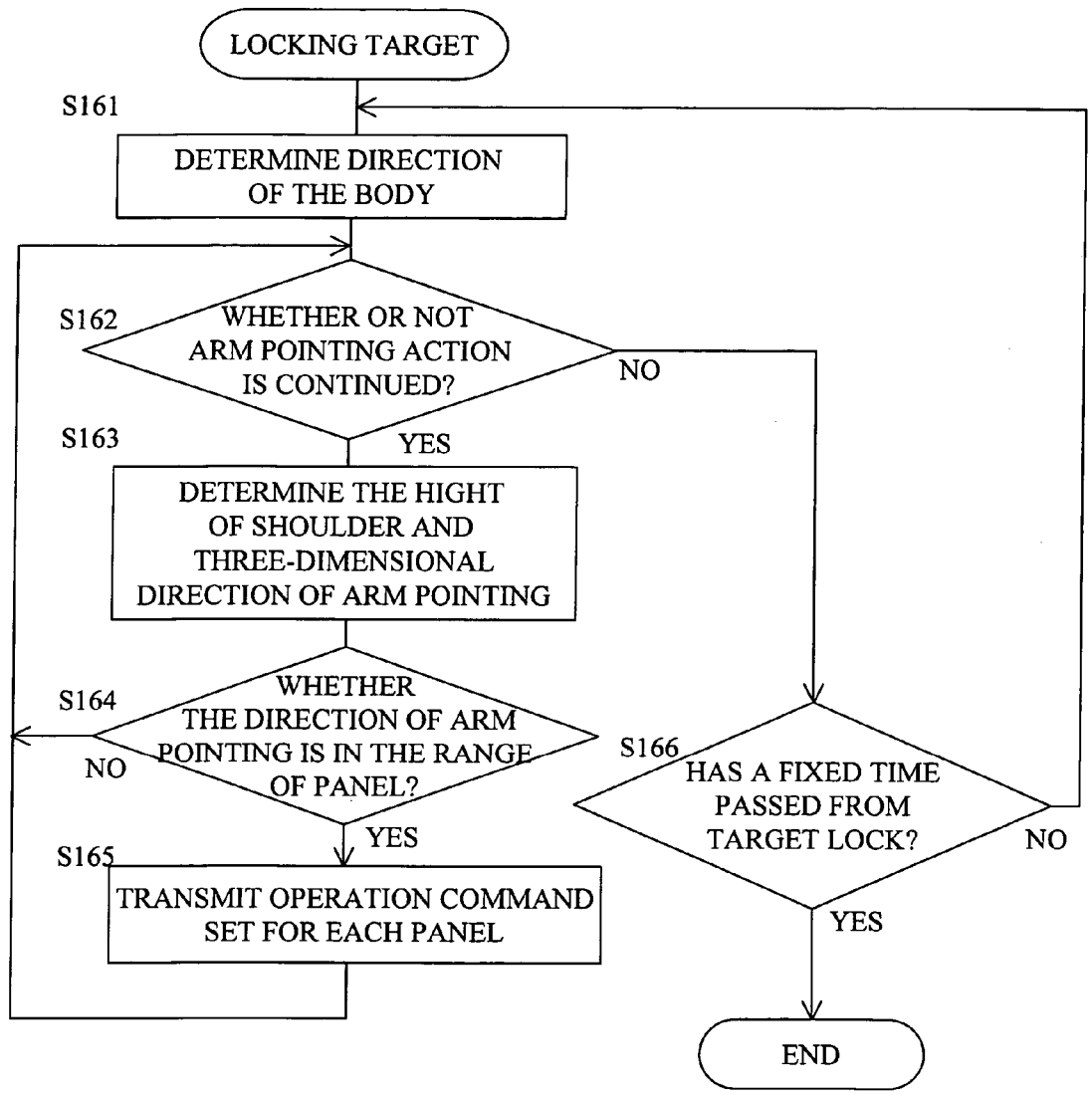
FIG. 27 is a flowchart for a panel touch operation of the invention.

FIG. 27 shows a flowchart for the panel touch operation. In step S161 of FIG. 27, the direction of the body (the direction of the shoulder) after the indicator 41 has locked the target is determined, which is then assumed as the base point of the panel touch operation. In the panel touch operation, a panel for indication (operation panel 42) is assumed to be present in front of the indicator 41. The operation panel 42 after the target lock is always set just in front of the indicator 41, as in the case of the indicator 41 in FIG. 25. The indicator 41 controls the operation object unit 6 by touching part of the operation panel 42 (which is segmented into nine in the example of FIG. 25).

In step S162, it is determined whether the arm pointing action is continued after the target lock, wherein when the arm pointing action is continued (Yes), the height of the shoulder and the direction of the arm pointing are determined in step S163. It is then determined in step S164 whether the arm pointing is present in the range of the operation panel 42 set in front of the body. When it is present in the range of the operation panel 42 (Yes), it is determined which panel is pointed and a command corresponding to the panel is transmitted in step S165. On the other hand, when it is determined in step S162 that no arm pointing is made (No), and when no arm pointing is made for a fixed period of time from the target lock (Yes) in step S166, the determination on arm pointing is terminated. The panel touch operation may be a combination of the operations to touch directly on the switch of the operation object unit 6, as described above.

Figure 28:
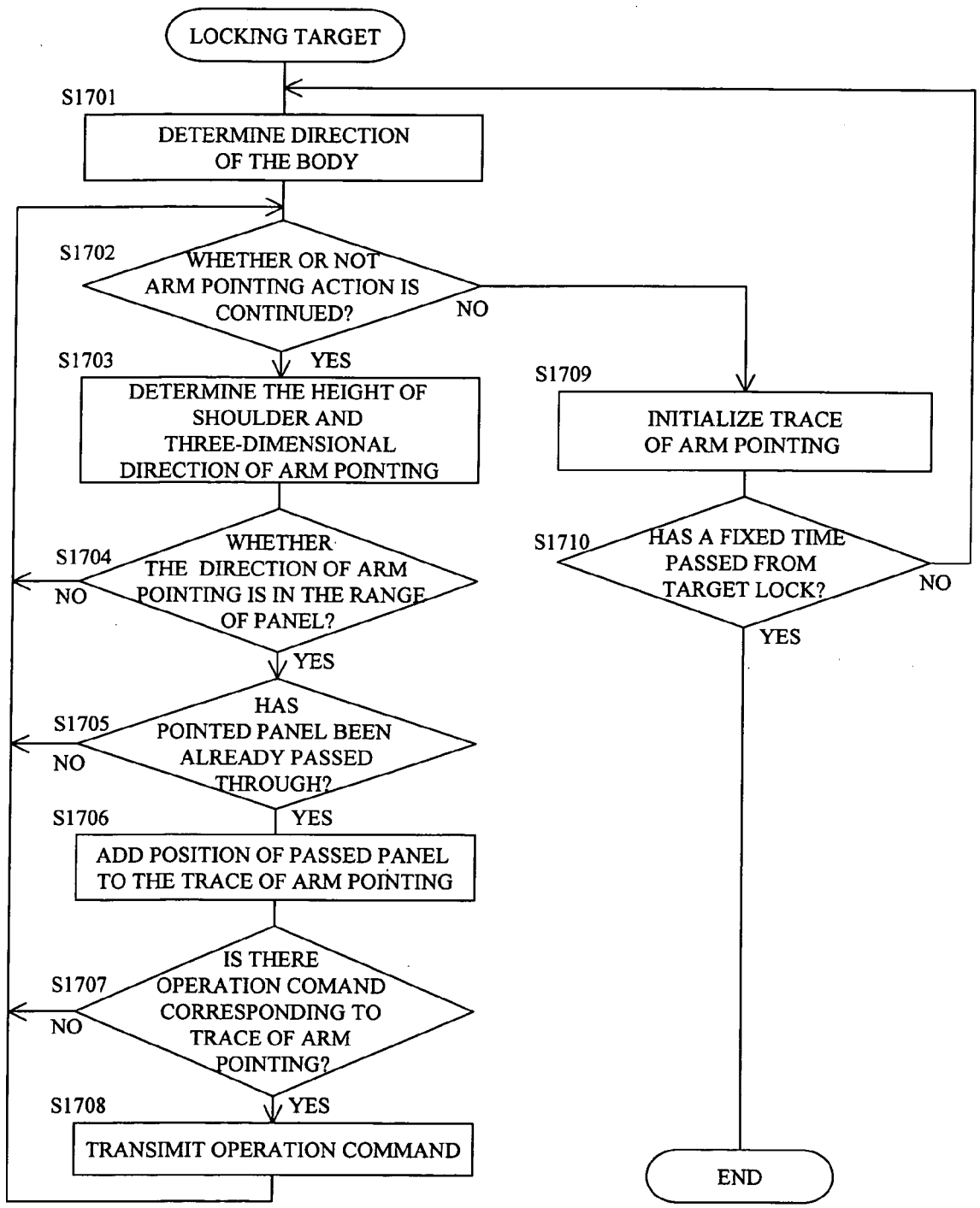
FIG. 28 is a flowchart for a panel gesture operation of the invention.

FIG. 28 shows a flowchart for the panel gesture operation. In step S1701 of FIG. 28, the direction of the body (the direction of the shoulder) after the indicator 41 has locked the target is determined, which is assumed as the base point of the panel gesture operation. In the panel gesture operation, the operation panel 42 after the target lock is always set just in front of the indicator 41, as in the case of the indicator 41 of FIG. 25. The indicator 41 controls the operation object unit 6 by the trace of arm pointing by the indicator 41 being determined in the range of the operation panel 42 (segmented into nine in the example of FIG. 25). In other words, different operation commands can be generated for similar circular traces depending on the order of passage. These commands can be set as desired by the operating-unit registration section 35.

Specifically, in step S1701, the direction of the body is determined and then, in step S1702, it is determined whether the arm pointing operation is continued after the target lock. When the arm pointing is being continued (Yes), the height of the shoulder and the three-dimensional direction of the arm pointing are determined in step S1703. Then it is determined in step S1704 whether the direction of the arm pointing is within the range of the operation panel 42 placed in front of the body, wherein when it is within the range of the operation panel 42 (Yes), then it is determined in step S1705 whether the arm of the indicator 41 has already passed the pointed panel. When it has not passed (No), the position of the panel is added to the trace of the arm pointing in step S1706. Then, in step S1707, it is determined whether there is an operation command corresponding to the trace of arm pointing, wherein when there is a corresponding command (Yes), the operation command is transmitted in step S1708. On the other hand, when no arm pointing is made (No) in step S1702, the trace of the arm pointing is initialized. In step S1710, it is determined whether a fixed period of time has passed after the target lock without arm pointing, wherein when the determination is Yes, the determination on arm pointing is terminated. Various operation commands can correspond to the panel gesture operation by changing the order of arm pointing trace.

Figure 29:
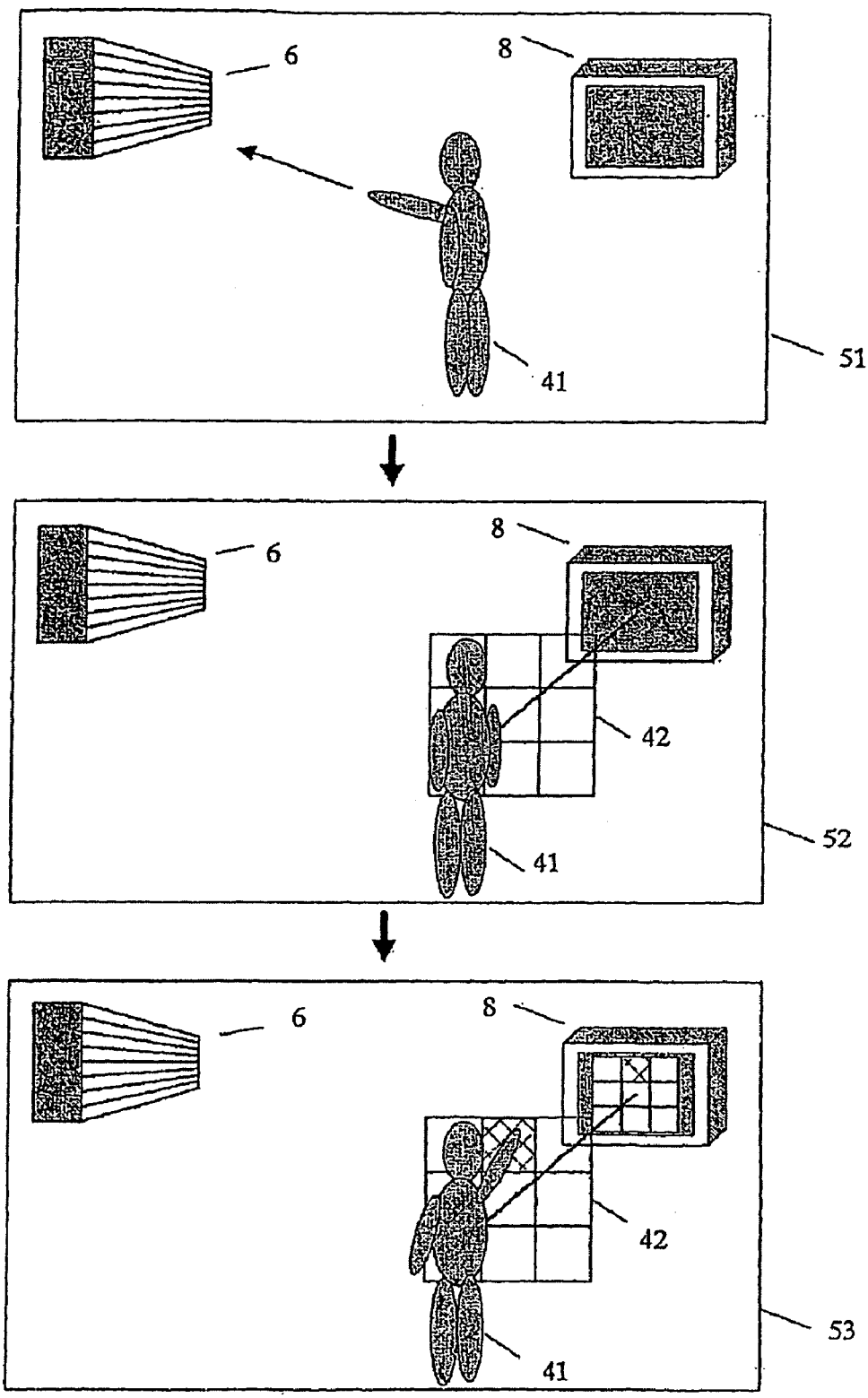
FIG. 29 is an explanatory diagram for the operation of an embodiment of the invention.

These crossing operation, panel touch operation, and panel gesture operation are based on making a pointing action for the operation object unit 6 after the target lock to the operation object unit 6 by the arm pointing. FIG. 29 shows an embodiment in which the use of the display 8 shown in FIGS. 3 and 4 allows complicated operation to be performed more easily.

FIG. 29 shows pointing-operation execution phases with a combination of the panel touch operation or the panel gesture operation and the display 8. In a target-lock execution phase 51 as the first step, the indicator 41 shows the intention of pointing the arm to the operation object unit 6. At that time, the indicator 41 points the arm to the operation object unit 6, with the display 8 present in a different direction.

Next, in an operation-panel-42 use phase 52 using the display 8 as the second step, the operation panel 42 is set on the straight line between the indicator 41 and the display 8 in the different direction, irrespective of the orientation of the body of the indicator 41, directly after the target lock. The operation panel 42 is always set on the straight line between the indicator 41 and the display 8 for a fixed period of time, whichever position the indicator 41 has moved to, and the operation panel 42 and operation commands therefor are displayed on the display 8.

In a panel-operation execution phase 53 using the display 8 as the third step, the indicator 41 can control the operation object unit 6 while viewing the operation panel 42 and information displayed on the display 8 without concern for the operation object unit 6 at all. By the method, the indicator 41 can easily control the operation object unit 6 with the assistance of the display 8, even for performing complicate operations or commands which are difficult to remember.

Another embodiment of the panel-operation execution phase 53 using the display 8 is a method in which no target lock is made from the beginning. In this method, the operation object unit 6 and the like is displayed on the display 8 as a menu, so that the indicator 41 can control all the devices from any indoor positions while turning only towards the display 8. This method provides a convenient interface particularly for persons who move little and always face in one direction, such as persons with disabilities.

Figure 24:
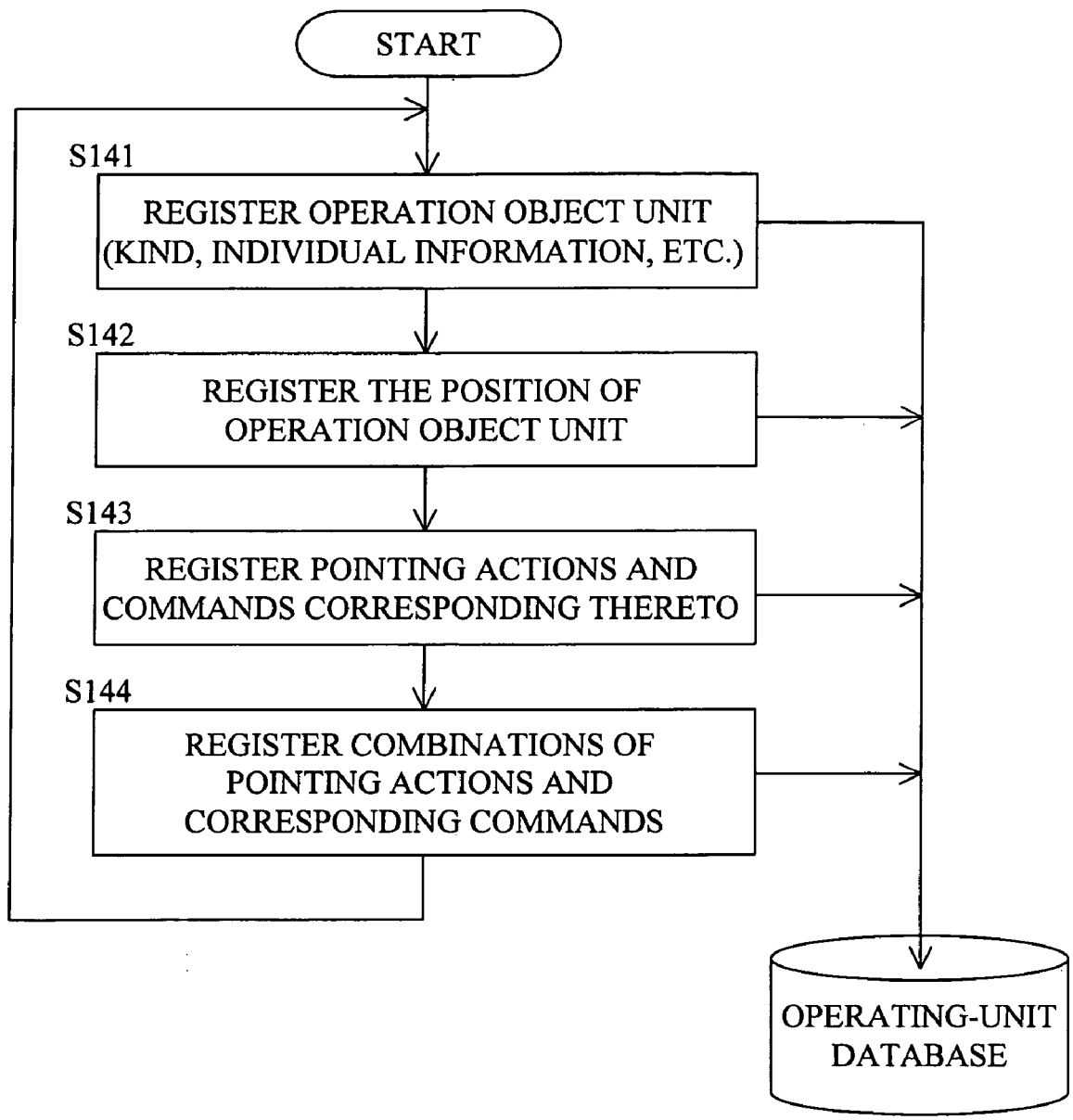
FIG. 24 is a flowchart for the registration of the operating-unit database of the invention.

The operating-unit registration section 35 of FIG. 5 allows information on the operation object unit 6 and various pointing actions for operating it and a combination thereof to be registered in the operating-unit database 34. FIG. 24 shows a flowchart for the embodiment. In step S141, the kind or individual information of the operation object unit 6 are registered first. Then, in step S142, the position of the operation object unit 6 is registered. In step S143, pointing actions and commands corresponding thereto are registered. In step S144, as a more complicated case, combinations of pointing actions and whether to use a display during a pointing action are registered. A series of the operations is repeated necessary times.

In a series of the registrations of the operating units, communications with intelligent home appliances employing Bluetooth or ECHONET are conducted using the operation-command transmitter-receiver 9. Specifically, necessary information is acquired by mutual communication between the operating-unit registration section 35 and the operation-command transmitter-receiver 9.

In step S142, with a lamp such as an LED mounted to the operating unit which is lit on at a command via Bluetooth or ECHONET, the three-dimensional position of the operating unit can automatically be determined, when it is in the field of view of the stereo cameras 1.

The invention is not limited to the foregoing embodiments but various modifications can be made within the scope or spirit of the invention.

As has been described in detail, the invention offers the following advantages:

(A) Noncontact and unrestricted arm pointing actions by multiple users in an indoor space can be achieved.

(B) An operation object unit in the indoor space can easily be operated by the user's arm pointing action of (A).

(C) A target directed by user's arm pointing can be reliably set by setting a specific area.

(D) When the specified area is the vicinity of the head on a nursing bed, the operation of the operation object unit in the indoor space can be assisted by arm pointing in all common postures such as standing, sitting, and lying postures and pointing actions by the arm pointing, with the specific area as the reference.

(E) False arm pointing can be detected accurately. Specifically, seeming arm pointing behaviors are reliably excluded from arm pointing to allow accurate determination on arm pointing.

The invention claimed is:

1. An interface apparatus comprising:
image processing means for picking up images of an interior of an indoor space with a plurality of stereo cameras, and producing a distance image based on the picked up images within a visual field and an indoor coordinate system on a camera-by-camera basis;
positional-posture and arm-pointing recognition means for extracting a positional posture and arm pointing of a user from distance information from the plurality of stereo cameras; and
pointing-action recognition means for determining, when arm pointing by the user has been identified, whether or not the arm pointing is a pointing action from a pointing direction and a motion of the arm,
wherein the positional-posture and arm-pointing recognition means for extracting arm pointing recognizes the pointing action in such a way that: the pointing-action recognition means divides three-dimensional distance information obtained from the plurality of stereo cameras into levels by 20 cm according to an indoor coordinate system by a different-level extracting method; projects a dot sequence in each level onto a two-dimensional plane and then binarizes the dot sequence into a two-dimensional binary image; labels two-dimensional binary images on a level-to-level basis; determines an overall center of gravity of clusters; stacks a center of gravity determined in each two-dimensional plane in levels on object-to-object basis again to use as a three-dimensional dot sequence; plots the center of gravity of each level along a Z-axis, in which eight levels (an upper half of a body) from an uppermost level (a head) are plotted on an X-Y plane; wherein when there is a large outlier compared to the overall center of gravity, determines that an arm-pointing action has been made; and determines a direction of the body by calculating image moments of the two-dimensional binary images of the eight levels from the uppermost level, an image moment being a rectangle equivalent to the two-dimensional binary image, and determining the vertical direction of a long side of a level having an area within a specified range and in which a difference between the long side and a short side of the image moment is a largest of an acquired eight sets of data as the direction of the body; when the arm-pointing action has been recognized, the pointing-action recognition means determines a direction of the arm pointing in such a way that: the pointing-action recognition means determines the direction of the arm pointing on the X-Y plane by drawing a perpendicular bisector between the overall center of gravity and the center of gravity of the two-dimensional binary image of a level of which the center of gravity is farthest from the overall center of gravity, erasing the two-dimensional binary image in a region corresponding to a body of a person to leave only an image of the arm; calculates the image moment of the two-dimensional binary image of only the arm to determine the long side, the center of gravity, a position of a distal end of the arm, and the overall center of gravity; and determines a Z-direction of the arm pointing from a stature, a height of eyes, and arm-length coefficient.

2. The interface apparatus according to claim 1, wherein a lower limit of determination on arm pointing is set from a head height and a height corresponding to a sitting height, wherein false arm pointing which is sensed lower than the lower limit is determined not to be arm pointing.

3. The interface apparatus according to claim 2, wherein false arm pointing which is sensed lower than the lower limit is a case in which the user stretches out his leg.

4. The interface apparatus according to claim 1, wherein when a ratio of the long side of the image moment to the stature is less than a given value, arm pointing is not determined.

5. The interface apparatus according to claim 4, wherein when the ratio of the long side of the image moment to the stature is less than a given value, slight arm pointing is determined.

6. The interface apparatus according to claim 1, wherein when r1/r2 is smaller than or equal to a value set from the stature, where r1 is a distance from an average center of gravity to a distal end of the arm pointing and r2 is a distance from the average center of gravity to a base end of the arm pointing, arm pointing is not determined.

7. The interface apparatus according to claim 6, wherein when r1/r2 is smaller than or equal to a value set from the stature, where r1 is the distance from an average center of gravity to the distal end of the arm pointing and r2 is the distance from the average center of gravity to the base end of the arm pointing, slight arm pointing is determined.

8. The interface apparatus according to claim 1, wherein an area S of the image moment is determined from a long side L1 and a short side L2, and a upper limit is set for the area S and a lower limit is set for the long side L1, wherein, when the area S or the long side L1 is outside a limit, arm pointing is not determined.

9. The interface apparatus according to claim 8, wherein when the area S or the long side L1 is outside the limit, both arms spread out is determined.

10. The interface apparatus according to claim 1, wherein when a ratio of a distance between a distal end of the arm pointing and an average center of gravity to a distance between a base end of the arm pointing and the average center of gravity is greater than a set value, arm pointing is not determined.

11. The interface apparatus according to claim 10, wherein when the ratio of the distance between the distal end of the arm pointing and the average center of gravity to the distance between the base end of the arm pointing and the average center of gravity is greater than a set value, both arms spread out is determined.

12. The interface apparatus according to claim 1, wherein when an average center of gravity of a partner is found within a specified radius around a distal end of the user arm pointing, arm pointing is not determined.

13. An interface apparatus comprising:
    image processing means for picking up images of an interior of an indoor space with a plurality of stereo cameras, and producing a distance image based on the picked up images within a visual field and an indoor coordinate system on a camera-by-camera basis;
    positional-posture and arm-pointing recognition means for extracting a positional posture and arm pointing of a user from distance information from the plurality of stereo cameras; and
    pointing-action recognition means for determining, when arm pointing by the user has been identified, whether or not the arm pointing is a pointing action from a pointing direction and a motion of the arm,
    wherein the positional-posture and arm-pointing recognition means for extracting arm pointing recognizes the pointing action in such a way that: the pointing-action recognition means divides three-dimensional distance information obtained from the plurality of stereo cameras into levels by 20 cm according to an indoor coordinate system by a different-level extracting method; projects a dot sequence in each level onto a two-dimensional plane and then binarizes the dot sequence into a two-dimensional binary image; labels two-dimensional binary images on a level-to-level basis; determines an overall center of gravity of clusters; stacks a center of gravity determined in each two-dimensional plane in levels on object-to-object basis again to use as a three-dimensional dot sequence; plots the center of gravity of each level along a Z-axis, in which eight levels (an upper half of a body) from an uppermost level (a head) are plotted on an X-Y plane;
    wherein:
        a specified area in the indoor space is registered in advance,
        when a user is present in the specified area, arm pointing for the specified area is identified, and
        with a periphery of a head part on a nursing bed being set as the specified area, when a user is present in the specified area, arm pointing for the specified area is identified.

14. The interface apparatus according to claim 13, wherein, with the periphery of the head part on a nursing bed being set as the specified area, when no user is present in the specified area, whether the user is in a standing, sitting, or lying posture is determined and then arm pointing is identified for respective postures.

* * * * *